United States Patent
Ishii et al.

(10) Patent No.: US 9,923,363 B2
(45) Date of Patent: Mar. 20, 2018

(54) TEMPERATURE MEASUREMENT DEVICE AND PROTECTIVE DEVICE FOR ACOUSTIC SIGNAL CONVERTER

(71) Applicant: YAMAHA CORPORATION, Hamamatsu-shi (JP)

(72) Inventors: Jun Ishii, Hamamatsu (JP); Kenta Ohnishi, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 497 days.

(21) Appl. No.: 14/416,425

(22) PCT Filed: Jul. 22, 2013

(86) PCT No.: PCT/JP2013/069820
§ 371 (c)(1),
(2) Date: Jan. 22, 2015

(87) PCT Pub. No.: WO2014/017444
PCT Pub. Date: Jan. 30, 2014

(65) Prior Publication Data
US 2015/0194799 A1    Jul. 9, 2015

(30) Foreign Application Priority Data

Jul. 23, 2012 (JP) .................................. 2012-162869
Sep. 24, 2012 (JP) .................................. 2012-209280

(51) Int. Cl.
*H02H 3/08* (2006.01)
*H04R 3/00* (2006.01)
(Continued)

(52) U.S. Cl.
CPC ............... *H02H 3/085* (2013.01); *G01K 7/00* (2013.01); *G01K 7/427* (2013.01); *G01K 13/00* (2013.01);
(Continued)

(58) Field of Classification Search
CPC .......... G01K 13/00; G01K 17/00; G01K 7/00; G01K 7/427; G01K 2217/00;
(Continued)

(56) References Cited

U.S. PATENT DOCUMENTS 7,448,797 B2 * 11/2008 Horn ...................... G01K 7/015
327/512
2002/0118841 A1    8/2002 Button et al.
(Continued)

FOREIGN PATENT DOCUMENTS

JP          03222600 A    10/1991
JP        2004007107 A     1/2004
(Continued)

OTHER PUBLICATIONS

International Search Report issued in PCT/JP2013/069820, dated Aug. 20, 2013. English translation provided.
(Continued)

*Primary Examiner* — Zeev V Kitov
(74) *Attorney, Agent, or Firm* — Rossi, Kimms & McDowell LLP

(57) ABSTRACT

An audio signal that is output from a sound source circuit (14) is caused to flow through a coil (16) in a transducer for vibrating a soundboard, and the vibration of the soundboard generates an acoustic signal. A microcomputer (30) calculates a temperature of the coil (16) with high accuracy by inputting an ambient temperature (Ta) detected by an ambient temperature sensor (21) and a voltage (V) applied to the coil (16) and executing computation based on a thermal equivalent circuit of an acoustic signal converter using the ambient temperature and the voltage that are input thereto, the computation including calculation of an amount of electric power consumed in the coil (16) using the input voltage.

17 Claims, 16 Drawing Sheets

(51) Int. Cl.
  *H04R 29/00* (2006.01)
  *G01K 7/00* (2006.01)
  *G01K 13/00* (2006.01)
  *G01K 7/42* (2006.01)
  *G10H 3/22* (2006.01)

(52) U.S. Cl.
  CPC ............... *G10H 3/22* (2013.01); *H04R 3/007* (2013.01); *H04R 29/003* (2013.01); *G01K 2217/00* (2013.01); *G10H 2220/351* (2013.01)

(58) Field of Classification Search
  CPC .. G01K 2220/351; H02H 3/085; H04R 3/007; H04R 29/003; G10H 3/22
  See application file for complete search history.

(56) References Cited

U.S. PATENT DOCUMENTS

2005/0163324 A1  7/2005  Neunaber
2007/0038396 A1* 2/2007  Zima ................ H02H 7/226
                                          702/65
2011/0182434 A1  7/2011  Martz et al.

FOREIGN PATENT DOCUMENTS

| | | |
|---|---|---|
| JP | 2006197515 A | 7/2006 |
| JP | 2008187856 A | 8/2008 |
| JP | 2008292739 A | 12/2008 |
| JP | 2010226797 A | 10/2010 |
| JP | 2011004210 A | 1/2011 |

OTHER PUBLICATIONS

European Search Report issued in European counterpart application No. EP138231672, dated Jan. 29, 2016.

* cited by examiner

TEMPERATURE MEASUREMENT DEVICE AND PROTECTIVE DEVICE FOR ACOUSTIC SIGNAL CONVERTER

TECHNICAL FIELD

The present invention relates to a temperature measurement device for an acoustic signal converter, which is configured to measure temperature of a coil of the acoustic signal converter, and to a protective device for an acoustic signal converter, which includes the temperature measurement device and is configured to protect the acoustic signal converter by inhibiting a temperature rise of the coil.

BACKGROUND ART

For example, as described in Patent Literature 1, there is hitherto known a keyboard instrument with a soundboard, which is configured so that an electric signal representing a music sound generated from a sound source circuit in accordance with keyboard performance is introduced to a coil of a transducer for vibrating the soundboard, and the soundboard is vibrated in accordance with the electric signal representing the music sound to generate a small instrumental sound.

Further, in Patent Literature 2, there is disclosed a technology in which a transformer having a primary winding that is arranged between an output amplifier and a speaker and is coupled to a high frequency coil in a switching power supply circuit detects an abnormal current so that the speaker and the output amplifier are protected via a CPU.

CITATION LIST

Patent Literature

[PTL 1] JP 2008-292739 A
[PTL 2] JP 2006-197515 A

SUMMARY OF INVENTION

Technical Problem

However, in the keyboard instrument with a soundboard in Patent Literature 1, a large current sometimes flows through the coil in order to vibrate the soundboard. There is a problem in that the large current excessively raises a temperature of the coil to cause an abnormal event in the coil or its peripheral devices or burning of the coil or its peripheral devices. In order to solve this problem, it is conceivable that the coil and its peripheral devices are protected by using the technology described in Patent Literature 2. However, the technology described in Patent Literature 2 does not directly measure the temperature of the coil, and the coil cannot be protected with high accuracy.

Solution to Problem

The present invention has been made in order to deal with the problem described above, and an object of the present invention is to provide a temperature measurement device for an acoustic signal converter, which is applicable to an acoustic signal converter for converting an electric signal into an acoustic signal through energization of a coil, and which can measure a temperature of the coil with high accuracy with a simple structure, and a protective device for an acoustic signal converter, which is configured to use the measured temperature to protect the acoustic signal converter and its peripheral devices with high accuracy. Note that, in description of components of the present invention described below, for the sake of easy understanding of the present invention, reference symbols of corresponding elements in embodiments described below are indicated in parentheses, but the components of the present invention should not be interpreted to be limited to structures of the corresponding elements indicated by the reference symbols in the embodiments.

In order to achieve the above-mentioned object, according to one configuration of the present invention, there is provided a temperature measurement device for an acoustic signal converter (40, 48), the acoustic signal converter including a coil (16) and being configured to convert an electric signal into an acoustic signal through energization of the coil, the temperature measurement device being configured to measure a temperature of the coil, the temperature measurement device including: an ambient temperature detector (21) for detecting an ambient temperature (Ta) of the acoustic signal converter; and a computing section (30, S11, S12) for calculating the temperature of the coil by inputting a voltage (V) applied to the coil and executing computation based on a thermal equivalent circuit of the acoustic signal converter using the input voltage and the detected ambient temperature (Ta), the computation including calculation of an amount of electric power (P) consumed in the coil using the input voltage.

Further, in this case, the computing section calculates an amount of electric power consumed in the coil by using, for example, resistance values of the coil ($R_L$, $R_L(Tc)$) and the input voltage. In particular, in the calculation of the amount of electric power, it is preferred to feed the calculated temperature of the coil back to the calculation of the amount of electric power so that the amount of electric power consumed in the coil is calculated by using the resistance value of the coil ($R_L(Tc)$) that changes in accordance with the temperature of the coil and the input voltage.

In the above-mentioned configuration of the present invention, the ambient temperature detector for detecting the ambient temperature is provided, and the computing section calculates the temperature of the coil by using the detected ambient temperature and the voltage applied to the coil based on the thermal equivalent circuit of the acoustic signal converter. Thus, the temperature of the coil of the acoustic signal converter is measured with high accuracy with a simple structure. In particular, when the temperature of the coil is fed back to the calculation of the amount of electric power, the resistance value of the coil is calculated with higher accuracy, and by extension, the temperature of the coil is measured with high accuracy.

Further, according to another configuration of the present invention, there is provided a temperature measurement device for an acoustic signal converter (40, 48), the acoustic signal converter including a coil (16) and being configured to convert an electric signal into an acoustic signal through energization of the coil, the temperature measurement device being configured to measure a temperature (Tc) of the coil, the temperature measurement device including: an ambient temperature detector (21) for detecting an ambient temperature (Ta) of the acoustic signal converter; a current detector (24) for detecting a current value (I) that flows through the coil; and a computing section (30, S11, S12) for calculating the temperature (Tc) of the coil by inputting a voltage (V) applied to the coil and executing computation based on a thermal equivalent circuit of the acoustic signal converter using the input voltage, the detected ambient temperature, and the detected current value, the computation including calculation of an amount of electric power (P) consumed in the coil using the input voltage and the detected current value.

In the above-mentioned another configuration of the present invention, the ambient temperature detector for detecting the ambient temperature and the current detector for detecting the current value that flows through the coil are provided. The computing section calculates the temperature of the coil by using the detected ambient temperature and current value and the voltage applied to the coil based on the thermal equivalent circuit of the acoustic signal converter. Thus, the temperature of the coil of the acoustic signal converter is measured with high accuracy with a simple structure. Further, in this case, the amount of electric power consumed by the coil is calculated by using the current value flowing through the coil and the voltage applied to the coil. Thus, the amount of electric power is calculated with high accuracy, and by extension, the temperature of the coil is measured with high accuracy.

Further, according to still another configuration of the present invention, there is provided a temperature measurement device for an acoustic signal converter (40, 48), the acoustic signal converter including a yoke (44) configured to form a magnetic path by a magnet (43), and a coil (16) that is arranged in the magnetic path and is, when energized, displaced with respect to the yoke, and being configured to convert an electric signal into an acoustic signal by causing an electric signal to flow through the coil, the temperature measurement device being configured to measure a temperature of the coil, the temperature measurement device including: an ambient temperature detector (21) for detecting an ambient temperature (Ta) of the acoustic signal converter; a yoke temperature detector (25) for detecting a temperature of the yoke; and a computing section (30, S11, S12) for calculating the temperature of the coil through computation using the detected ambient temperature and the detected yoke temperature based on a thermal equivalent circuit of the acoustic signal converter.

In the above-mentioned still another configuration of the present invention, the ambient temperature detector for detecting the ambient temperature and the yoke temperature detector for detecting the yoke temperature are provided. The computing section calculates the temperature of the coil by using the detected ambient temperature and yoke temperature based on the thermal equivalent circuit of the acoustic signal converter. Thus, the temperature of the coil of the acoustic signal converter is measured with high accuracy with a simple structure.

Further, according to still another configuration of the present invention, the temperature measurement device further includes a wind speed detector (28) for detecting a wind speed in an ambience in which the acoustic signal converter is placed, and the computing section uses the detected wind speed in correcting the calculation of the temperature of the coil. According to this, even when the wind speed in the ambience of the acoustic signal converter changes to change a heat dissipation resistance of a member (for example, yoke or bobbin) in the acoustic signal converter, the change in heat dissipation resistance can be reflected on the temperature of the coil. Thus, the temperature of the coil may be measured with higher accuracy.

Further, according to still another configuration of the present invention, the thermal equivalent circuit for calculating the temperature of the coil by the computing section takes into consideration a filter configured to compensate for a positional difference between the ambient temperature detector and the acoustic signal converter. According to this, even when the ambient temperature detector and the acoustic signal converter are apart from each other and there is a difference between air temperature at the ambient temperature detector and air temperature at the acoustic signal converter, the difference in air temperature is also taken into consideration in calculating the temperature of the coil. Thus, the temperature of the coil is calculated with high accuracy.

In addition, according to still another configuration of the present invention, there is provided a protective device for an acoustic signal converter, including: the above-mentioned temperature measurement device; and a protector for, when the calculated temperature of the coil is equal to or higher than a predetermined temperature, blocking energization of the coil with an electric signal or reducing an amount of energization of the coil with the electric signal. According to this, when the temperature of the coil is equal to or higher than the predetermined temperature, a temperature rise of the coil due to the energization of the coil is inhibited, and thus, an abnormal event, burning, or the like of the acoustic signal converter and its peripheral devices is not caused. Thus, the acoustic signal converter and its peripheral devices are appropriately protected.

DESCRIPTION OF EMBODIMENTS a. First Embodiment

Figure 1:
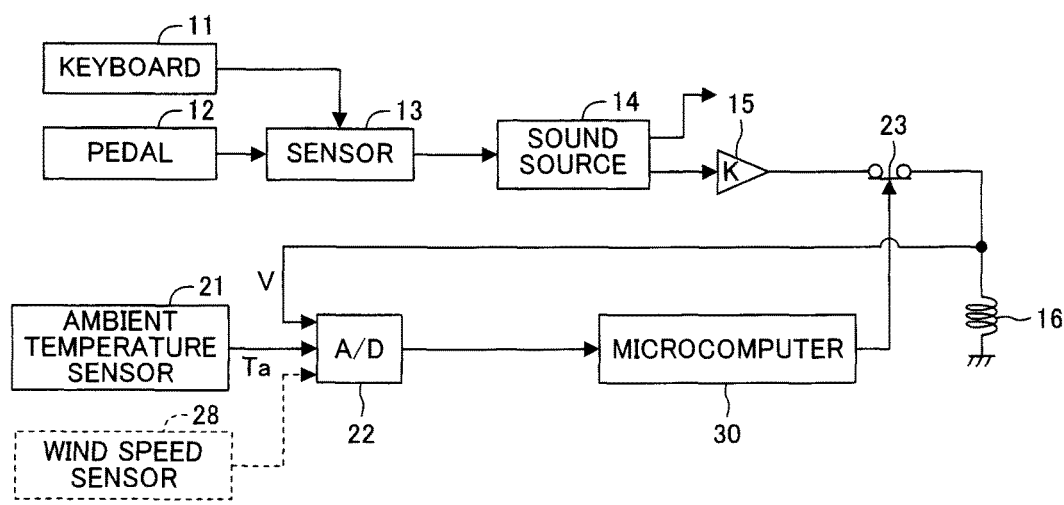
FIG. 1 is a schematic block diagram illustrating an electronic circuit built in a piano for vibrating a soundboard according to a first embodiment of the present invention.

First, a piano according to a first embodiment of the present invention is described. In this piano, a hammer is driven via an action mechanism in accordance with a pressing down operation and a releasing operation of a key, and a piano sound is generated in accordance with striking of a string by the hammer. The piano also has the function of generating a small sound by controlling driving of a transducer by an electric signal to drive a soundboard by the transducer. A portion for generating a small sound that is directly relevant to the present invention is described in detail in the following. FIG. 1 is a schematic block diagram illustrating an electronic circuit built in a piano for vibrating the soundboard for the purpose of generating a small piano sound or other instrumental sounds.

This piano includes a keyboard 11 and pedals 12. The keyboard 11 is formed of a plurality of white keys and black keys, and is performance means that is pressed down and released by a hand of a performer. The pedals 12 include a damper pedal, a soft pedal, a shift pedal, a sostenuto pedal, or the like, and are performance means operated by a foot of the performer.

Further, this piano includes, for the purpose of generating a small instrumental sound, a sensor circuit 13, a sound source circuit 14, an amplifier circuit 15, and a coil 16. The sensor circuit 13 includes a plurality of sensors that detect a location of the pressing down, a speed of the pressing down, and the like on the keyboard 11, a moved location, a moving speed, and the like of a hammer (not shown) that is driven by a pressing down operation of the keyboard 11, and a location of an operation of the pedals 12.

The sound source circuit 14 outputs, in accordance with an operation state of the pedals 12, a sound signal at a pitch corresponding to a key that is pressed down on the keyboard 11 with a volume in accordance with the speed of the pressing down of the key, based on the location of the pressed down key, the speed of the pressing down, and the like on the keyboard 11, the moved location, the moving speed, and the like of the hammer, and the location of the operation of the pedals 12 that are detected by the sensor circuit 13. Note that, a music sound signal that is output from the sound source circuit 14 is an audio signal (electric signal) corresponding to a piano sound in general, but there are cases in which the sound signal is an audio signal (electric signal) corresponding to an instrumental sound other than a piano sound. The audio signal from the sound source circuit 14 is output via the amplifier circuit 15 to the coil 16. Note that, in the figure, another audio signal is output from the sound source circuit 14. This audio signal is used for another channel and is output to a circuit device similar to a circuit device described below. For the sake of simplification, a destination to which the audio signal for the another channel is output is omitted in the figure. Further, the audio signal that is output from the sound source circuit 14 can be supplied also to headphones, another audio device, or the like other than the coil 16.

The amplifier circuit 15 amplifies the input audio signal with an amplification factor K, and outputs the resultant signal to one end of the coil 16 via a relay circuit 23. The coil 16 is provided in a transducer 40, and another end of the coil 16 is grounded. This causes, when the audio signal is output from the sound source circuit 14, a current corresponding to the audio signal to flow through the coil 16.

Figure 2:
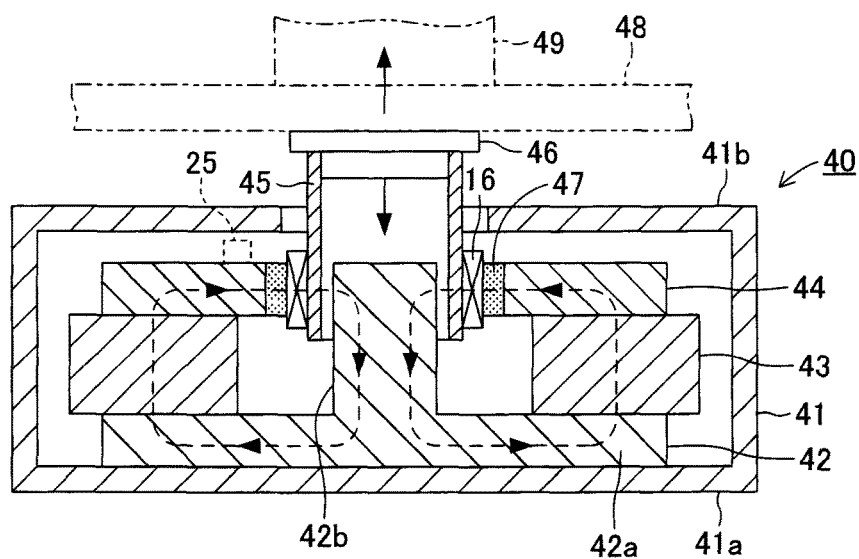
FIG. 2 is a longitudinal sectional view of a transducer for vibrating the soundboard.

As illustrated in a longitudinal sectional view of FIG. 2, the transducer 40 has a bottom surface portion 41a and a top surface portion 41b, and includes a housing 41 having a cylindrical space formed therein. The housing 41 is fixed to a bracing of the piano at the bottom surface portion 41a, and has a circular through hole formed at the center of the top surface portion 41b. A yoke 42, a magnet 43, and a yoke 44 are housed in the housing 41. The yoke 42 has a disk portion 42a formed into a disk shape and a cylindrical portion 42b formed at the center of the disk portion 42a so as to protrude upward, and is fixed onto the bottom surface of the housing 41 at a lower surface of the disk portion 42a. The magnet 43 is formed into a cylindrical shape and is fixed onto the disk portion 42a of the yoke 42 at a bottom surface thereof. The cylindrical portion 42b of the yoke 42 pierces a through hole formed at the center of the magnet 43. The yoke 44 is also formed into a cylindrical shape and is fixed onto the magnet 43 at a bottom surface thereof. The cylindrical portion 42b of the yoke 42 pierces a through hole formed at the center of the yoke 44. In this way, a magnetic path is formed as indicated by the broken lines in the figure.

Further, the transducer 40 includes a bobbin 45 and the coil 16 described above. The bobbin 45 is formed into a cylindrical shape, and a disk-like cap 46 is adhered to an upper end thereof in a fixed manner. The bobbin 45 and the cap 46 are used for the purpose of vibrating a soundboard 48 and a bridge 49 that supports a string (not shown) of the piano. An upper surface of the cap 46 is bonded to a lower surface of the soundboard 48 with an adhesive, double-faced tape, or the like at a location immediately below or in proximity to the bridge 49 for supporting the string (not shown). The bobbin 45 passes through the through hole formed in the top surface portion 41b of the housing 41 so that a lower portion thereof enters space between an outer peripheral surface of the cylindrical portion 42b of the yoke 42 and an inner peripheral surface of the yoke 44. The coil 16 is wound on an outer peripheral surface of the bobbin 45 at a location of the magnetic path indicated by the broken lines in the figure. A magnetic fluid 47 is provided between an outer peripheral surface of the coil 16 and the inner peripheral surface of the yoke 44.

With such a structure, when a current corresponding to an audio signal flows through the coil 16, the coil 16 and the bobbin 45 are vibrated in vertical directions in the figure to vibrate the soundboard 48 and the bridge 49 correspondingly to the audio signal, and thus, an acoustic signal corresponding to the audio signal is generated by the vibration of the soundboard 48. Therefore, the transducer 40 and the soundboard 48 form an acoustic signal converter for converting an audio signal, that is, an electric signal, into an acoustic signal.

Description is again made with reference to FIG. 1. This piano includes an ambient temperature sensor 21, an A/D conversion circuit 22, the relay circuit 23, and a microcomputer 30, for the purpose of measuring a temperature of the coil 16 and protecting the transducer 40 including the coil 16 and its peripheral devices.

The ambient temperature sensor 21 is formed of, for example, a thermal diode temperature sensor, a thermistor temperature sensor, or the like, and detects a temperature Ta in a room in which the piano is placed, that is, an ambient temperature Ta of the transducer 40 and outputs a detection signal representing the ambient temperature Ta. It is desired that the ambient temperature sensor 21 be arranged as close to the transducer 40 as possible. A voltage V applied to the coil 16 and the detection signal representing the ambient temperature Ta are input to the A/D conversion circuit 22 so that the applied voltage V and the detection signal are subjected to A/D conversion and then supplied to the microcomputer 30. The relay circuit 23 connected between the amplifier circuit 15 and the coil 16 is a relay switch that operates to be on/off under the control of the microcomputer 30, and controls switching between energization and de-energization of the coil 16. Note that, in the first embodiment, a voltage at a node between the coil 16 and the relay circuit 23 is supplied to the A/D conversion circuit 22 as the applied voltage V, but a voltage at a node between the amplifier circuit 15 and the relay circuit 23 may be supplied to the A/D conversion circuit 22 as the applied voltage V.

The microcomputer 30 includes a CPU, a ROM, a RAM, and the like. The microcomputer 30 inputs the ambient temperature Ta and the voltage V applied to the coil 16 that are input from the A/D conversion circuit 22 through program processing illustrated in FIG. 3 to calculate a temperature Tc of the coil 16, and controls on/off of the relay circuit 23 by using the calculated temperature Tc.

Figure 4A:
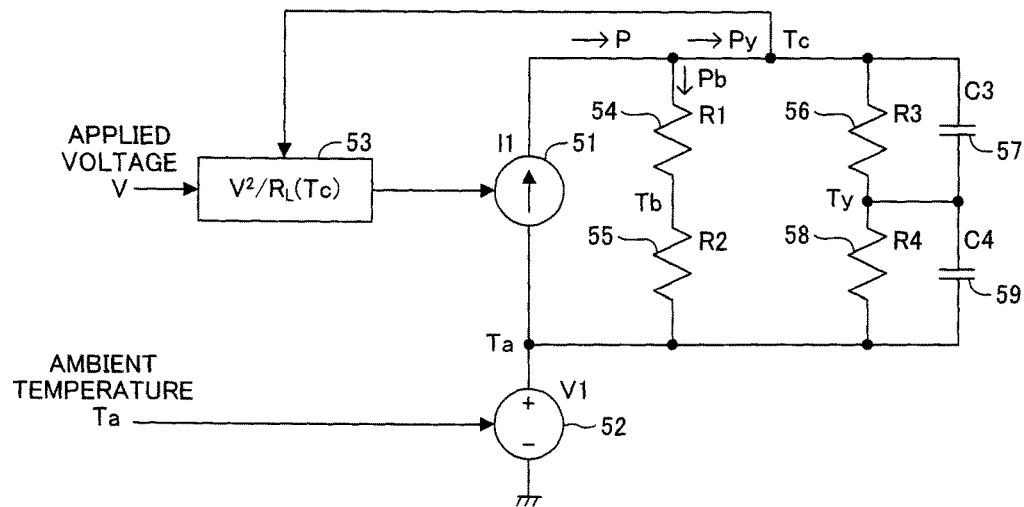
FIG. 4(A) illustrates a thermal equivalent circuit of a transducer for calculating a temperature of a coil illustrated in FIG. 1.

Here, a method of measuring the temperature Tc of the coil 16 is described. The temperature Tc is measured through, on the assumption that there is a thermal equivalent circuit of the transducer 40, thermal equivalent circuit computation based on the thermal equivalent circuit. Note that, in the thermal equivalent circuit, magnitude of a current (ampere) corresponds to electric power (watt), magnitude of a voltage (volt) corresponds to a temperature (° C.), magnitude of a resistance (ohm) corresponds to a thermal resistance (° C./watt), and a capacitance of a capacitor (farad) corresponds to a thermal capacity (joule/° C.). FIG. 4(A) illustrates the thermal equivalent circuit for calculating the temperature Tc of the coil 16 in the transducer 40.

Description of the thermal equivalent circuit is made. The thermal equivalent circuit includes a current source 51 and a voltage source 52. The current source 51 corresponds to a heat source generated by a power consumption P of the coil 16, and outputs a current I1 that corresponds to the power consumption P under the control of a computing unit 53 for calculating the power consumption P. In this case, when a resistance value of the coil 16 is represented by $R_L(Tc)$ and the voltage applied to the coil 16 is represented by V, the power consumption P of the coil 16 is represented as Math. 1. Note that, the resistance value $R_L(Tc)$ of the coil 16 is, as described in detail below, represented as a function of the temperature Tc of the coil 16. Therefore, the computing unit 53 inputs the voltage V applied to the coil 16 and the temperature Tc of the coil 16, and calculates the power consumption P of the coil 16 based on Math. 1.

$$P = \frac{V^2}{R_L(Tc)} \qquad \text{[Math. 1]}$$

The voltage source 52 corresponds to the temperature in the room in which the transducer 40 is placed, that is, the ambient temperature Ta, and outputs a voltage corresponding to the ambient temperature Ta detected by the ambient temperature sensor 21.

Heat generated by the coil 16 is dissipated in the room via the bobbin 45, and at the same time, is dissipated in the room via the magnetic fluid 47 and the yoke 44. Symbol Pb represents a dissipated power that is dissipated via the bobbin 45, and symbol Py represents a dissipated power that is dissipated via the magnetic fluid 47 and the yoke 44. Therefore, a coil-bobbin thermal resistor 54 and a bobbin heat dissipation resistor 55 are connected in series in a current path corresponding to a heat dissipation path via the bobbin 45 provided between the current source 51 and the voltage source 52. The coil-bobbin thermal resistor 54 and the bobbin heat dissipation resistor 55 have resistance values R1 and R2, respectively. Further, a parallel circuit of a magnetic fluid thermal resistor 56 and a magnetic fluid thermal capacitor 57 and a parallel circuit of a yoke heat dissipation resistor 58 and a yoke thermal capacitor 59 are connected in series in a current path corresponding to a heat dissipation path via the magnetic fluid 47 and the yoke 44 provided between the current source 51 and the voltage source 52. The magnetic fluid thermal resistor 56 and the yoke heat dissipation resistor 58 have resistance values R3 and R4, respectively. Further, the magnetic fluid thermal capacitor 57 and the yoke thermal capacitor 59 have capacitance values C3 and C4, respectively. Those resistance values R1, R2, R3, and R4 and capacitance values C3 and C4 are known values that are measured in advance.

Therefore, in the thermal equivalent circuit formed in this way, a voltage at a node among the current source 51, the coil-bobbin thermal resistor 54, the magnetic fluid thermal resistor 56, and the magnetic fluid thermal capacitor 57 corresponds to the temperature Tc of the coil 16. A voltage at a node between the coil-bobbin thermal resistor 54 and the bobbin heat dissipation resistor 55 corresponds to a temperature Tb of the bobbin 45. A voltage at a node among the magnetic fluid thermal resistor 56, the magnetic fluid thermal capacitor 57, the yoke heat dissipation resistor 58, and the yoke thermal capacitor 59 corresponds to a yoke temperature Ty.

Figure 5A:
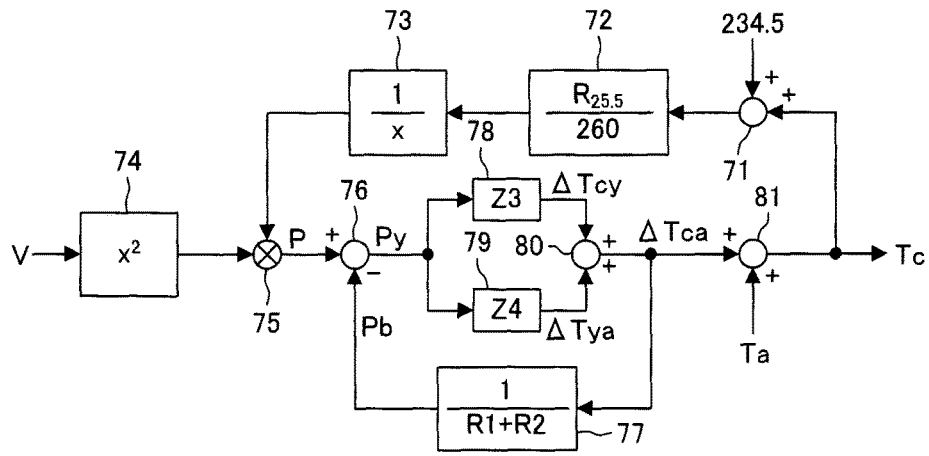
FIG. 5(A) is a computation block diagram for computing the temperature of the coil by a microcomputer based on the thermal equivalent circuit illustrated in FIG. 4(A)

Next, a computation block for computing the temperature Tc of the coil 16 by the microcomputer 30 based on the thermal equivalent circuit is described. FIG. 5(A) is a computation block diagram, and FIG. 5(C) is a detailed computation block diagram of computing portions 78 and 79 illustrated in FIG. 5(A). In the computation block diagram of FIG. 5(A), an adding portion 71, a multiplying portion 72, a reciprocal converting portion 73, a square computing portion 74, and a multiplying portion 75 correspond to the computing unit 53 and the current source 51 in FIG. 4(A).

Here, a relationship between the resistance value $R_L(Tc)$ of the coil 16 and the temperature Tc of the coil 16 is described. In accordance with a computational expression of a resistance method that is hitherto known, Math. 2 holds.

$$\frac{R_{L2}}{R_{L1}} = \frac{234.5 + T2}{234.5 + T1} \quad [\text{Math. 2}]$$

In Math. 2, T1 is a temperature of the coil 16 before the energization, $R_{L1}$ is a resistance value of the coil 16 before the energization, T2 is a temperature of the coil 16 after the energization, and $R_{L2}$ is a resistance value of the coil 16 after the energization.

Math. 2 is transformed into Math. 3 to express the resistance value $R_{L2}$.

$$R_{L2} = \frac{234.5 + T2}{234.5 + T1} \cdot R_{L1} \quad [\text{Math. 3}]$$

It is assumed here that the temperature T1 of the coil 16 before the energization is 25.5° C. The resistance value $R_{L1}$ of the coil 16 at the temperature T1 (=25.5) is measured. When the resistance value $R_{L1}$ is represented by R25.5, Math. 3 is expressed as Math. 4.

$$R_{L2} = \frac{R_{25.5}}{260} \cdot (234.5 + T2) \quad [\text{Math. 4}]$$

By performing the computation expressed by Math. 4 by substituting the temperature Tc of the coil 16 for the temperature T2, the resistance value $R_L(Tc)$ (=$R_{L2}$) of the coil 16 at the temperature Tc is calculated.

Description is again made with reference to FIG. 5(A). The computation expressed by Math. 4 corresponds to computing processing by the adding portion 71 and the multiplying portion 72. The reciprocal converting portion 73 converts the calculated resistance value $R_L(Tc)$ into a reciprocal thereof. Further, the square computing portion 74 squares the voltage V applied to the coil 16 that is input thereto, and the multiplying portion 75 multiplies an output of the reciprocal converting portion 73 by an output of the square computing portion 74 and outputs the result. Computing processing by the reciprocal converting portion 73, the square computing portion 74, and the multiplying portion 75 corresponds to the computation expressed by Math. 1. As a result, the multiplying portion 75 calculates the power consumption P of the coil 16.

A subtracting portion 76 subtracts a result of multiplication by a multiplying portion 77 from a result of multiplication by the multiplying portion 75, and outputs the result to the computing portions 78 and 79. The multiplying portion 77 multiplies a result of addition by an adding portion 80 by a value 1/(R1+R2). Computing processing by the multiplying portion 77 is computation in which a voltage across the coil-bobbin thermal resistor 54 and a voltage across the bobbin heat dissipation resistor 55 are divided by a sum of the resistance value R1 of the coil-bobbin thermal resistor 54 and the resistance value R2 of the bobbin heat dissipation resistor 55, and is computing processing of calculating current amounts that flow through the coil-bobbin thermal resistor 54 and the bobbin heat dissipation resistor 55, respectively. In the thermal equivalent circuit, the current corresponds to the electric power, and thus, a result of the computation by the multiplying portion 77 corresponds to the dissipated power Pb via the bobbin 45. The subtracting portion 76 subtracts the dissipated power Pb via the bobbin 45 from the power consumption P of the coil 16 and outputs the result. Thus, the output of the subtracting portion 76 corresponds to the dissipated power Py via the magnetic fluid 47 and the yoke 44.

A computing portion 78 inputs a current corresponding to the dissipated power Py via the magnetic fluid 47 and the yoke 44, and calculates a voltage across the magnetic fluid thermal resistor 56 and the magnetic fluid thermal capacitor 57, that is, a temperature rise ΔTcy in the magnetic fluid 47. A computing portion 79 inputs a current corresponding to the dissipated power Py via the magnetic fluid 47 and the yoke 44, and calculates a voltage across the yoke heat dissipation resistor 58 and the yoke thermal capacitor 59, that is, a temperature rise ΔTya in the yoke 44. The detailed computation block of the computing portions 78 and 79 is described below with reference to FIG. 5(C). The adding portion 80 sums an output value of the computing portion 78 and an output value of the computing portion 79, and its output means calculation of ΔTca that is a sum of the temperature rise ΔTcy in the magnetic fluid 47 and the temperature rise ΔTya in the yoke 44, in other words, calculation of a voltage across a series circuit of the magnetic fluid thermal resistor 56 and the yoke heat dissipation resistor 58. The output of the adding portion 80 is supplied to an adding portion 81. The adding portion 81 adds the ambient temperature Ta to the output value of the adding portion 80 and outputs the result. Therefore, the output of the adding portion 81 represents the temperature Tc of the coil 16.

As illustrated in FIG. 5(C), each of the computing portions 78 and 79 includes gain control portions (multiplying portions) 82, 84, 86, and 87, a delay portion 85, a subtracting portion 83, and an adding portion 88. The gain control portion 82 multiplies the dissipated power Py by a gain G, and outputs the result to the subtracting portion 83. The subtracting portion 83 subtracts an input value from the gain control portion 84 from an input value from the gain control portion 82, and outputs the result to each of the gain control portion 86 and the delay portion 85. The delay portion 85 performs unit delay of an input value from the subtracting portion 83, and outputs the result to each of the gain control portions 84 and 87. The gain control portion 84 multiplies an input value from the delay portion 85 by a gain $b_1$ and outputs the result to the subtracting portion 83. The gain control portion 86 multiplies the input value from the subtracting portion 83 by a gain $a_0$ and outputs the result to the adding portion 88. The gain control portion 87 multiplies the input value from the delay portion 85 by a gain $a_1$ and outputs the result to the adding portion 88. The adding portion 88 sums an input value from the gain control portion 86 and an input value from the gain control portion 87, and outputs the result.

In the computing portion 78, when a sampling cycle of the dissipated power Py is represented by T3, the gain G of the gain control portion 82 is R3·W3/(α3+W3), the gain $b_1$ of the gain control portion 84 is (α3−W3)/(α3+W3), the gain $a_0$ of the gain control portion 86 is "1", and the gain $a_1$ of the gain control portion 87 is "1". Note that, the value α3 is 2/T3 and the value W3 is 1/(C3·R3). Further, in the computing portion 79, when a sampling cycle of the dissipated power Py is represented by T4, the gain G of the gain control portion 82 is R4·W4/(α4+W4), the gain $b_1$ of the gain control portion 84 is (α4−W4)/(α4+W4), the gain $a_0$ of the gain control portion 86 is "1", and the gain $a_1$ of the gain control portion 87 is "1". Note that, the value α4 is 2/T4 and the value W3 is 1/(C4·R4).

In this case, as described above, all of the resistance values R1, R2, R3, and R4 and the capacitance values C3 and C4 that are used in the computation blocks illustrated in FIG. 5(A) and FIG. 5(C) are known values, and thus, by inputting the voltage V applied to the coil 16 and the ambient temperature Ta, the temperature Tc of the coil 16 is calculated in accordance with the computation blocks illustrated in FIG. 5(A) and FIG. 5(C).

Next, operation of the piano according to the first embodiment that is formed as described above is described. When a performer performs performance operation of the keyboard 11 and the pedals 12, the performance operation of the keyboard 11 and the pedals 12 is detected by the sensor circuit 13, and a detection signal by the sensor circuit 13 that represents the performance is supplied to the sound source circuit 14. Based on the detection signal that represents the performance, the sound source circuit 14 outputs an electric music sound signal (audio signal) representing a piano sound to the coil 16 via the amplifier circuit 15 and the relay circuit 23. As described in detail below, the relay circuit 23 is controlled to be in an off state when the temperature Tc of the coil 16 is equal to or higher than a predetermined upper limit temperature Tup, and is set to be in an on state at least in an initial state thereof. Therefore, a voltage signal that is the audio signal amplified with the amplification factor K flows through the coil 16.

The voltage signal causes a current having magnitude proportional to the voltage signal to flow through the coil 16. The current flowing through the coil 16 causes the transducer 40 to vibrate the bobbin 45 and the cap 46 in the vertical directions in FIG. 2, and thus, the soundboard 48 and the bridge 49 are also vibrated correspondingly to the vibration of the bobbin 45 and the cap 46. Therefore, the vibration of the soundboard 48 converts the audio signal into an acoustic signal, and the performer and an audience can hear a performance sound corresponding to the performance of the keyboard 11 and the pedals 12 by the performer. Note that, the performance sound by the vibration of the soundboard 48 using the transducer 40 is an instrumental sound at a lower volume level compared with a sound generated when a string is vibrated by a hammer, that is, a smaller instrumental sound.

Next, detection of the temperature Tc of the coil 16 is described. When the piano is being played, the microcomputer 30 repeatedly executes the program illustrated in FIG. 3 at predetermined short time intervals. Execution of the program starts in Step S10. In Step S11, the microcomputer 30 inputs the voltage V applied to the coil 16 (audio signal) and the ambient temperature Ta via the A/D conversion circuit 22. Then, in Step S12, the microcomputer 30 calculates the temperature Tc of the coil 16. The temperature Tc of the coil 16 is calculated in accordance with the computing processing illustrated in the computation blocks of FIGS. 5(A) and 5(C) based on the thermal equivalent circuit of the transducer 40 illustrated in FIG. 4(A). After the processing in Step S12 described above, in Step S13, the microcomputer 30 determines whether the calculated temperature Tc of the coil 16 is equal to or higher than the upper limit temperature Tup. Note that, the upper limit temperature Tup is a temperature that is too high for the coil 16. In this case, when the temperature Tc of the coil 16 is not too high, in Step S13, the microcomputer 30 determines as "No", that is, determines that the temperature Tc of the coil 16 is lower than the upper limit temperature Tup, and the execution of the program ends in Step S15. Therefore, in this case, by driving the transducer 40 by the audio signal described above, a performance sound is continuously generated by the vibration of the soundboard 48.

On the other hand, when the temperature Tc of the coil 16 excessively rises to be equal to or higher than the upper limit temperature Tup, the microcomputer 30 determines as "Yes" in Step S13, and controls the relay circuit 23 to be in the off state in Step S14. With this, an input signal path to the coil 16 is blocked in this case, and the audio signal does not pass through the coil 16 to stop the generation of the performance sound.

As described above, in the first embodiment described above, the microcomputer 30 inputs the voltage V applied to the coil 16 and the ambient temperature Ta detected by the ambient temperature sensor 21, and calculates the temperature Tc of the coil 16 in accordance with the computing processing based on the thermal equivalent circuit of the transducer 40 by using only the applied voltage V and the ambient temperature Ta that are input thereto. As a result, according to the first embodiment described above, the temperature Tc of the coil 16 can be measured with high accuracy with a simple structure. Further, in the calculation of the temperature Tc of the coil 16, in the process of calculating the power consumption P of the coil 16 that is used in calculating the temperature Tc, the temperature Tc of the coil 16 is fed back so that the resistance value $R_L(Tc)$ of the coil 16 corresponding to the temperature Tc is used in calculating the power consumption P. Therefore, even when the temperature Tc of the coil 16 changes, change in resistance value $R_L(Tc)$ of the coil 16 due to the change in temperature Tc is taken into consideration in calculating the power consumption P of the coil 16, and thus, the temperature Tc of the coil 16 is detected with high accuracy.

Further, according to the first embodiment, the measured temperature Tc of the coil 16 is used so that, when the temperature Tc of the coil 16 is equal to or higher than the upper limit temperature Tup, the relay circuit 23 is switched to the off state so as not to cause the current to flow through the coil 16. This prevents the temperature Tc of the coil 16 from rising excessively, and thus, an abnormal event and burning of the coil 16 and its peripheral devices can be avoided to appropriately protect the piano. Therefore, the relay circuit 23 functions as protecting means for protecting the coil 16 and its peripheral devices.

Note that, in the first embodiment, the temperature Tc of the coil 16 is calculated on the assumption that the ambient temperature sensor 21 is arranged in proximity to the transducer 40 and that the temperature Ta in the room detected by the ambient temperature sensor 21 is the ambient temperature Ta of the transducer 40. However, when the ambient temperature sensor 21 is not arranged in proximity to the transducer 40, there are cases in which the temperature Ta detected by the ambient temperature sensor 21 cannot be dealt as the ambient temperature of the transducer 40. Specifically, there are cases in which the ambient temperature sensor 21 and the transducer 40 are apart from each other and temperatures differ to some extent between the air temperature Ta at the ambient temperature sensor 21 and an air temperature Tr at the transducer 40.

Figure 4B:
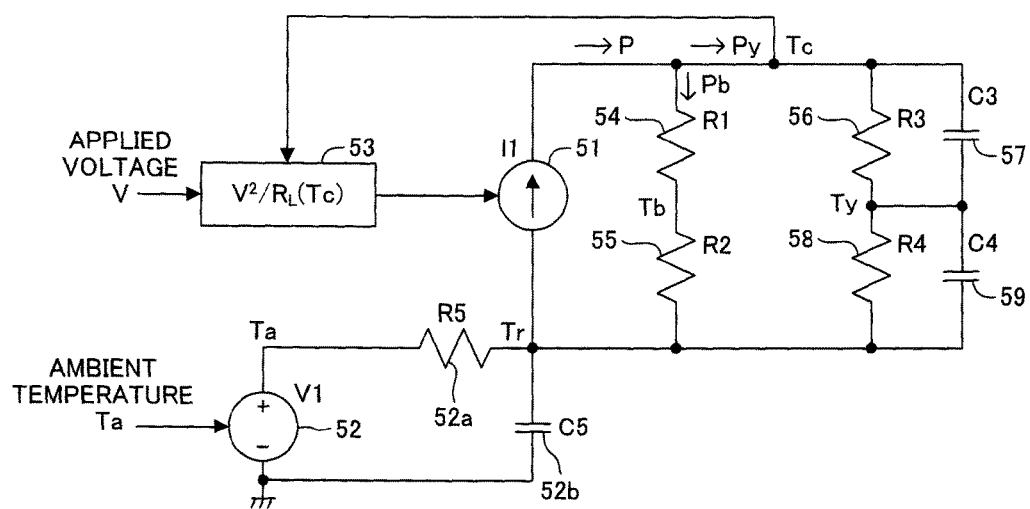
FIG. 4(B) illustrates a thermal equivalent circuit of a transducer according to a modified example of the one illustrated in FIG. 4(A).

In this case, taking into consideration space between the ambient temperature sensor 21 and the transducer 40, the above-mentioned thermal equivalent circuit illustrated in FIG. 4(A) is modified as illustrated in FIG. 4(B). Specifically, in a thermal equivalent circuit illustrated in FIG. 4(B), a low-pass filter including a thermal resistance 52a of air between the ambient temperature sensor 21 and the transducer 40 and a thermal capacity 52b of the air between the ambient temperature sensor 21 and the transducer 40 is added between the current source 51 and the voltage source 52 of the thermal equivalent circuit illustrated in FIG. 4(A). In this case, the thermal resistance 52a has a resistance value R5 and the thermal capacity 52b has a capacitance value C5, both of which are known values that are obtained through measurement in advance.

Figure 5B:
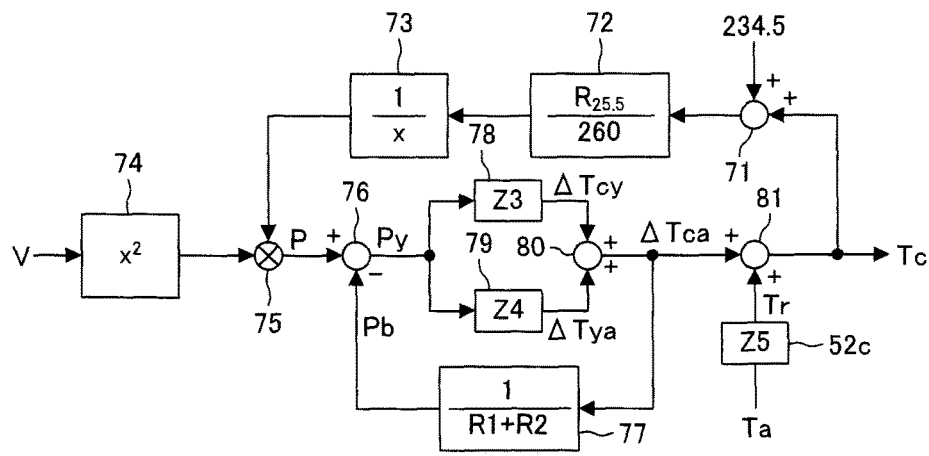
FIG. 5(B) is a computation block diagram for computing the temperature of the coil by a microcomputer based on the thermal equivalent circuit illustrated in FIG. 4(B)
Figure 5C:
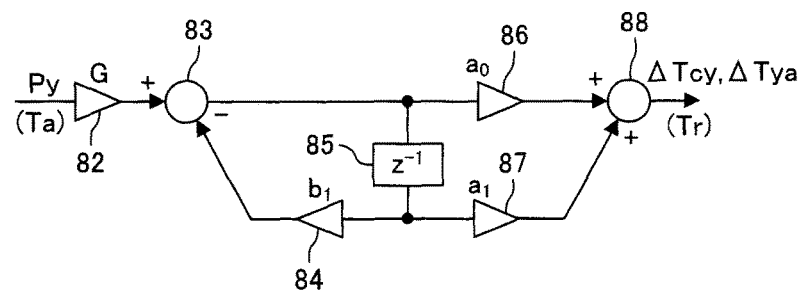
FIG. 5(C) is a detailed computation block diagram for a part of a computing portion of the computation block diagram illustrated in FIG. 5(A) or 5(B).

A computation block diagram corresponding to the thermal equivalent circuit illustrated in FIG. 4(B) is as illustrated in FIG. 5(B). In the computation block diagram illustrated in FIG. 5(B), the air temperature Ta at the ambient temperature sensor 21 is computed by a computing portion 52c, and the result is input to the adding portion 81 as the air temperature Tr at the transducer 40. Other portions are the same as those in the above-mentioned computation block diagram illustrated in FIG. 5(A). Similarly to the computing portions 78 and 79 described above, the computing portion 52c is formed as illustrated in FIG. 5(C). In this case, in FIG. 5(C), when a sampling cycle of the air temperature Ta at the ambient temperature sensor 21 is represented by T5, the gain G of the gain control portion 82 is R5·W5/($\alpha$5+W5), the gain $b_1$ of the gain control portion 84 is ($\alpha$5−W5)/($\alpha$5+W5), the gain $a_0$ of the gain control portion 86 is "1", and the gain $a_1$ of the gain control portion 87 is "1". Note that, the value $\alpha$5 is 2/T5 and the value W5 is 1/(C5·R5). Also in this case, the resistance value R5 and the capacitance value C5 used in the computation blocks illustrated in FIG. 5(B) and FIG. 5(C) are known values as described above, and thus, by inputting the voltage V applied to the coil 16 and the ambient temperature Ta, the temperature Tc of the coil 16 is calculated in accordance with the computation blocks illustrated in FIG. 5(B) and FIG. 5(C).

Figure 3:
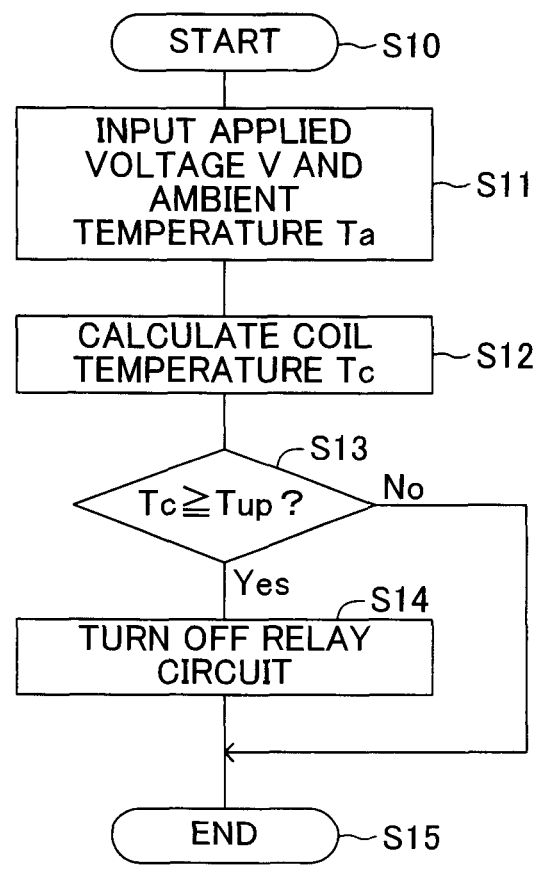
FIG. 3 is a flow chart of a program executed by a microcomputer illustrated in FIG. 1.

Further, also in this modified example, similarly to the case of the first embodiment, the microcomputer 30 executes the program illustrated in FIG. 3. However, in this case, in Step S12, the temperature Tc of the coil 16 is calculated in accordance with the computation blocks illustrated in FIG. 5(B) and FIG. 5(C). Therefore, according to this modified example, even when the ambient temperature sensor 21 and the transducer 40 are apart from each other and there is a difference between the air temperature Ta at the ambient temperature sensor 21 and the air temperature Tr at the transducer 40, the difference in air temperature is taken into consideration in calculating the coil temperature Tc. Thus, the temperature Tc of the coil 16 is calculated with high accuracy.

b. Second Embodiment

Next, a piano according to a second embodiment of the present invention is described. An electronic circuit of the piano according to the second embodiment is formed similarly to the one according to the first embodiment illustrated in the schematic block diagram of FIG. 1. Further, the transducer 40 of the piano according to the second embodiment is formed similarly to the transducer of the first embodiment illustrated in FIG. 2. The second embodiment is different from the first embodiment described above only in thermal equivalent circuit for calculating the temperature Tc of the coil 16 and in computation block for calculating the temperature Tc of the coil 16 based on the thermal equivalent circuit, and other points are the same as those in the first embodiment described above. Therefore, in the following description of the second embodiment, only points different from those of the above-mentioned first embodiment are described, and like reference symbols are used to denote like portions to omit description thereof.

Figure 6A:
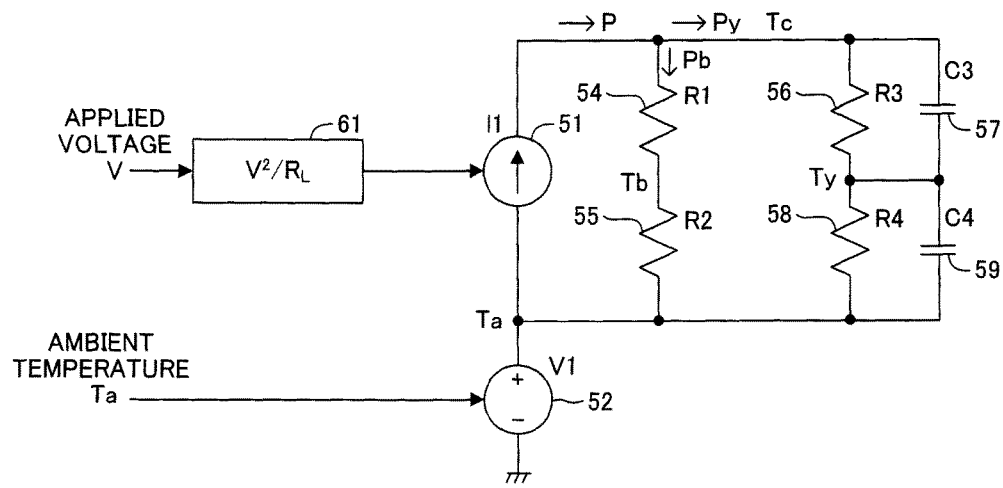
FIG. 6(A) illustrates a thermal equivalent circuit of a transducer for calculating a temperature of a coil according to a second embodiment of the present invention, which is a modification of the thermal equivalent circuit illustrated in FIG. 4(A)

In the second embodiment, change in resistance value $R_L$ of the coil 16 due to change in temperature Tc of the coil 16 is neglected, and the resistance value $R_L$ is assumed to be always constant. Therefore, in the thermal equivalent circuit of the transducer 40, as illustrated in FIG. 6(A), the feedback path of the temperature Tc of the coil 16 in the first embodiment described above is omitted, and a computing unit 61 is included instead of the computing unit 53 in the first embodiment described above. The computing unit 61 only inputs the voltage V applied to the coil 16, and calculates the power consumption P of the coil 16 in accordance with Math. 5. Note that, the resistance value $R_L$ in this case is a known value that is measured in advance. Other structures are the same as those in the case of the first embodiment described above.

$$P = \frac{V^2}{R_L} \qquad \text{[Math. 5]}$$

Figure 7A:
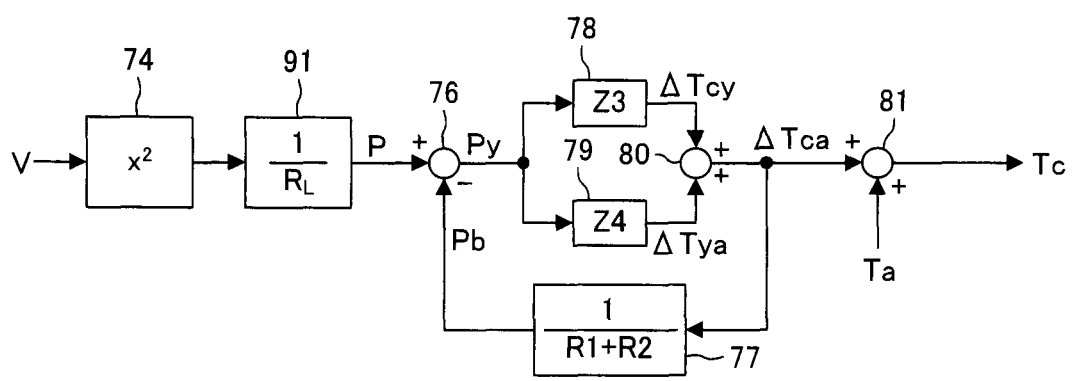
FIG. 7(A) is a computation block diagram for computing the temperature of the coil by a microcomputer based on the thermal equivalent circuit illustrated in FIG. 6(A)

A computation block for calculating the temperature Tc of the coil 16 based on the thermal equivalent circuit is as illustrated in FIG. 7(A). Specifically, in this computation block, the adding portion 71, the multiplying portion 72, and the reciprocal converting portion 73 in the computation block of the first embodiment illustrated in FIG. 5(A) are omitted, and a computing portion 91 related to the computing unit 61 illustrated in FIG. 6(A) is included instead of the multiplying portion 75. The computing portion 91 calculates the power consumption P of the coil 16 by dividing a square value $V^2$ of the voltage V that is input from the square computing portion 74 by the resistance value $R_L$ of the coil 16, and outputs the result to the adding portion 76. Other portions in the computation block are the same as those in the case of the first embodiment described above.

Operation of the second embodiment formed in this way is described. Also in the second embodiment, the microcomputer 30 calculates the temperature Tc of the coil 16 by executing the program illustrated in FIG. 3, and determines whether the calculated temperature Tc is equal to or higher than the upper limit temperature Tup. However, in this case, in Step S12, the temperature Tc of the coil 16 is calculated in accordance with the computation block illustrated in FIG. 7(A) by using the applied voltage V and the ambient temperature Ta. When the calculated temperature Tc is lower than the upper limit temperature Tup, the relay circuit 23 is held in the on state so that the audio signal (voltage signal) is continuously applied to the coil 16, thereby converting the audio signal into an acoustic signal. Thus, the performer and an audience can hear a performance sound corresponding to the performance of the keyboard 11 and the pedals 12 by the performer. On the other hand, when the calculated temperature Tc is equal to or higher than the upper limit temperature Tup, the relay circuit 23 is switched to the off state so that the application of the audio signal (voltage signal) to the coil 16 is blocked, thereby preventing the temperature Tc of the coil 16 from excessively rising. Thus, an abnormal event and burning of the coil 16 and its peripheral devices can be avoided.

Also in this calculation of the temperature Tc of the coil 16, the microcomputer 30 inputs the voltage V applied to the coil 16 and the ambient temperature Ta detected by the ambient temperature sensor 21, and calculates the temperature Tc of the coil 16 by using only the applied voltage V and the ambient temperature Ta that are input thereto. However, as described above, in this calculation of the temperature Tc, the power consumption P of the coil 16 is calculated in accordance with the computation block illustrated in FIG. 7(A), that is, on the assumption that the resistance value $R_L$ of the coil 16 is a fixed value. Therefore, according to the second embodiment, change in resistance value $R_L$(Tc) of the coil 16 due to change in temperature Tc is neglected, and thus, the accuracy of the temperature Tc of the coil 16 is lowered to some extent compared with the case of the first embodiment described above. However, the calculation of the temperature Tc of the coil 16 is simpler compared with the case of the first embodiment described above.

Figure 6B:
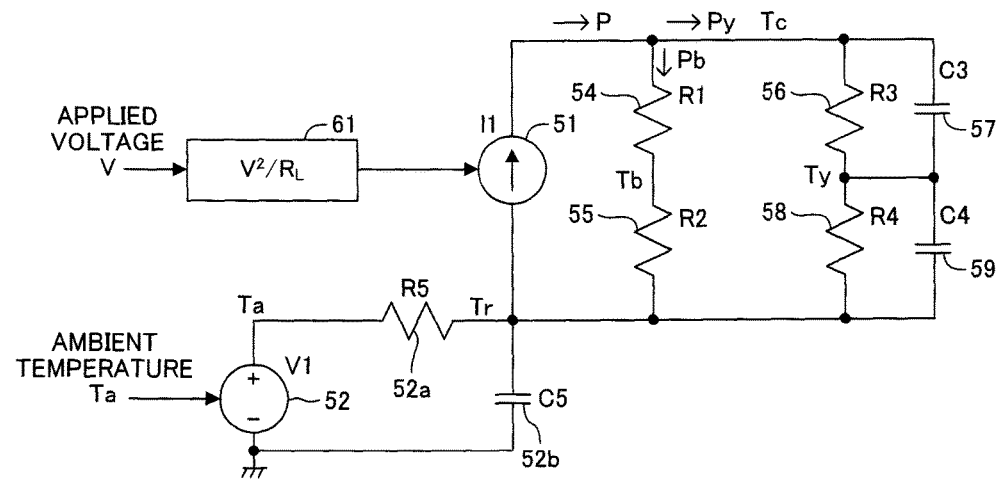
FIG. 6(B) illustrates a thermal equivalent circuit of a transducer according to a modified example of the one illustrated in FIG. 6(A).
Figure 7B:
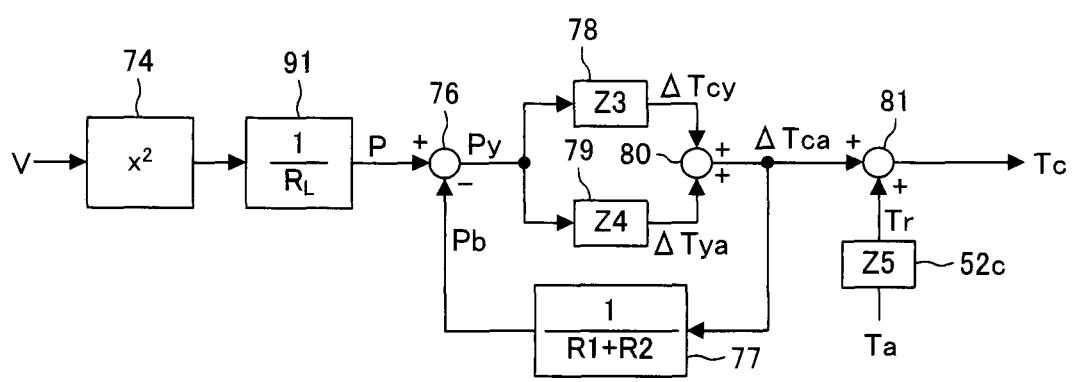
FIG. 7(B) is a computation block diagram for computing the temperature of the coil by a microcomputer based on the thermal equivalent circuit illustrated in FIG. 6(B).

Note that, also in the second embodiment, the temperature Tc of the coil 16 is calculated on the assumption that the ambient temperature sensor 21 is arranged in proximity to the transducer 40 and that the temperature Ta in the room detected by the ambient temperature sensor 21 is the ambient temperature Ta of the transducer 40. However, also in this case, there are cases in which the ambient temperature sensor 21 and the transducer 40 are apart from each other and temperatures differ to some extent between the air temperature Ta at the ambient temperature sensor 21 and the air temperature Tr at the transducer 40. Therefore, also in this case, taking into consideration space between the ambient temperature sensor 21 and the transducer 40, the above-mentioned thermal equivalent circuit illustrated in FIG. 6(A) is modified as illustrated in FIG. 6(B), and the above-mentioned computation block diagram illustrated in FIG. 7(A) is modified as illustrated in FIG. 7(B). The modification is the same as that of the thermal equivalent circuit and the computation block diagram according to the modified example of the first embodiment described above, and thus, like reference symbols are used to omit description thereof.

The microcomputer 30 calculates the temperature Tc of the coil 16 in accordance with the computation block illustrated in FIG. 7(B) according to the modified example. Therefore, also according to this modified example, even when the ambient temperature sensor 21 and the transducer 40 are apart from each other and there is a difference between the air temperature Ta at the ambient temperature sensor 21 and the air temperature Tr at the transducer 40, the difference in air temperature is taken into consideration in calculating the coil temperature Tc. Thus, the temperature Tc of the coil 16 is calculated with high accuracy.

c. Third Embodiment

Next, a piano according to a third embodiment of the present invention is described. In an electronic circuit of the piano according to the third embodiment, compared with the above-mentioned case of the first embodiment illustrated in FIG. 1, a resistor 24 for detecting a current (that is, the resistor 24 as current detecting means) having a predetermined small resistance value r is connected between the coil 16 and the ground. A voltage Vr at a node between the resistor 24 and the coil 16 (that is, a terminal voltage Vr of the resistor 24) is supplied to the A/D conversion circuit 22. Note that, the resistance value r of the resistor 24 is small, and thus, does not affect the voltage V applied to the coil 16. The A/D conversion circuit 22 performs, in addition to the A/D conversion of the voltage V applied to the coil 16 and the detection signal representing the ambient temperature Ta detected by the ambient temperature sensor 21 in the case of the first embodiment described above, A/D conversion of the terminal voltage Vr of the resistor 24, and supplies the result to the microcomputer 30. Other portions of the electronic circuit are formed similarly to those in the case of the first embodiment described above. Further, the transducer 40 of the piano according to the third embodiment is also formed similarly to the above-mentioned transducer of the first embodiment illustrated in FIG. 2. Therefore, also in the case of the third embodiment, only points different from those of the above-mentioned first embodiment are described, and like reference symbols are used to denote like portions to omit description thereof.

Figure 9A:
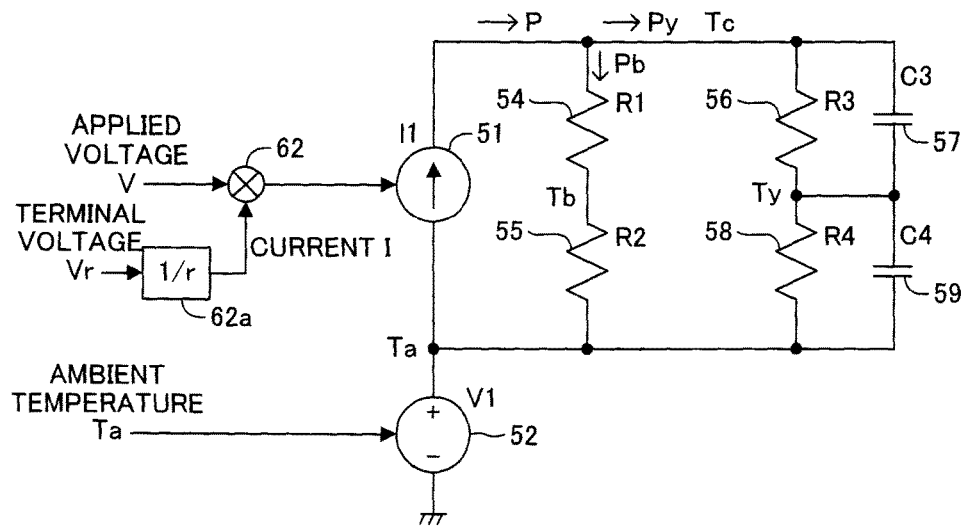
FIG. 9(A) illustrates a thermal equivalent circuit of a transducer for calculating a temperature of a coil illustrated in FIG. 8 according to the third embodiment of the present invention.

In the thermal equivalent circuit of the transducer 40 for calculating the temperature Tc of the coil 16 in the third embodiment, as illustrated in FIG. 9(A), the feedback path of the temperature Tc of the coil 16 in the first embodiment described above is omitted, and a multiplier 62 is included instead of the computing unit 53 in the first embodiment described above. The multiplier 62 inputs the voltage V applied to the coil 16 and a current I calculated by a divider 62a, and calculates the power consumption P of the coil 16 in accordance with Math. 6. The divider 62a divides the terminal voltage Vr of the resistor 24 by the resistance value r of the resistor 24 to calculate the current I that flows through the coil 16. Note that, the divider 62a may be omitted when it is possible to use, as the resistor 24, a resistor having the resistance value r as a standard unit with which the terminal voltage Vr can be regarded as the current I, or, when it is possible to substantially regard the terminal voltage Vr as the current I that flows through the coil 16 through subsequent computing processing. Other structures are the same as those in the case of the first embodiment described above.

$$P = V \cdot I \qquad \text{[Math. 6]}$$

Figure 10A:
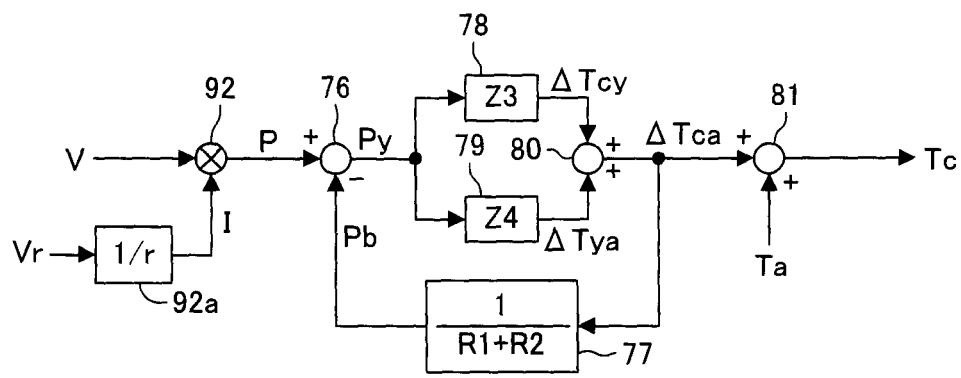
FIG. 10(A) is a computation block diagram for computing the temperature of the coil by a microcomputer based on the thermal equivalent circuit illustrated in FIG. 9(A)

A computation block for calculating the temperature Tc of the coil 16 based on the thermal equivalent circuit is as illustrated in FIG. 10(A). Specifically, in this computation block, the adding portion 71, the multiplying portion 72, the reciprocal converting portion 73, and the computing portion 74 in the computation block of the first embodiment illustrated in FIG. 5(A) are omitted, and a multiplying portion 92 and a dividing portion 92a respectively corresponding to the multiplier 62 and the divider 62a illustrated in FIG. 9(A) are included instead of the square computing portion 74 and the multiplying portion 75. The dividing portion 92a calculates the current value I by dividing the terminal voltage Vr by the resistance value r. The multiplying portion 92 calculates the power consumption P by multiplying the voltage value V by the current value I and outputs the result to the adding portion 76. Other portions in the computation block are the same as those in the case of the first embodiment described above.

Operation of the third embodiment formed in this way is described. Also in the third embodiment, the microcomputer 30 calculates the temperature Tc of the coil 16 by executing the program illustrated in FIG. 3, and determines whether the calculated temperature Tc is equal to or higher than the upper limit temperature Tup. However, in this case, in Step S11, in addition to the applied voltage V and the ambient temperature Ta, the terminal voltage Vr (substantially representing the current value I) is input. Further, in Step S12, the temperature Tc of the coil 16 is calculated in accordance with the computation block illustrated in FIG. 10(A) by using the applied voltage V, the terminal voltage Vr (substantially representing the current value I), and the ambient temperature Ta. When the calculated temperature Tc is lower than the upper limit temperature Tup, the relay circuit 23 is held in the on state so that the audio signal (voltage signal) is continuously applied to the coil 16, thereby converting the audio signal into an acoustic signal. Thus, the performer and an audience can hear a performance sound corresponding to the performance of the keyboard 11 and the pedals 12 by the performer. On the other hand, when the calculated temperature Tc is equal to or higher than the upper limit temperature Tup, the relay circuit 23 is switched to the off state so that the application of the audio signal (voltage signal) to the coil 16 is blocked, thereby preventing the temperature Tc of the coil 16 from excessively rising. Thus, an abnormal event and burning of the coil 16 and its peripheral devices can be avoided.

As described above, in this calculation of the temperature Tc of the coil 16, the microcomputer 30 inputs, in addition to the voltage V applied to the coil 16 and the ambient temperature Ta, the terminal voltage Vr of the resistor 24 (substantially representing the current value I), and calculates the temperature Tc of the coil 16 in accordance with the computation block illustrated in FIG. 10(A) by using the applied voltage V, the terminal voltage Vr (substantially representing the current value I), and the ambient temperature Ta. Therefore, according to the third embodiment, it is necessary to detect the current value I that flows through the coil 16, but the current value I can be detected with a simple structure. Thus, similarly to the case of the first embodiment described above, the calculation of the temperature Tc of the coil 16 is simplified.

Figure 9B:
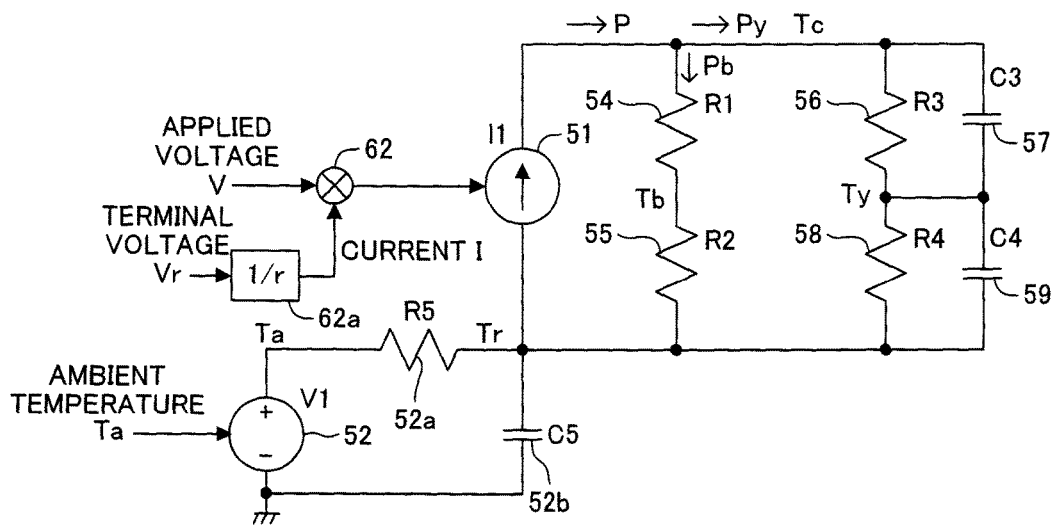
FIG. 9(B) illustrates a thermal equivalent circuit of a transducer according to a modified example of the one illustrated in FIG. 9(A).
Figure 10B:
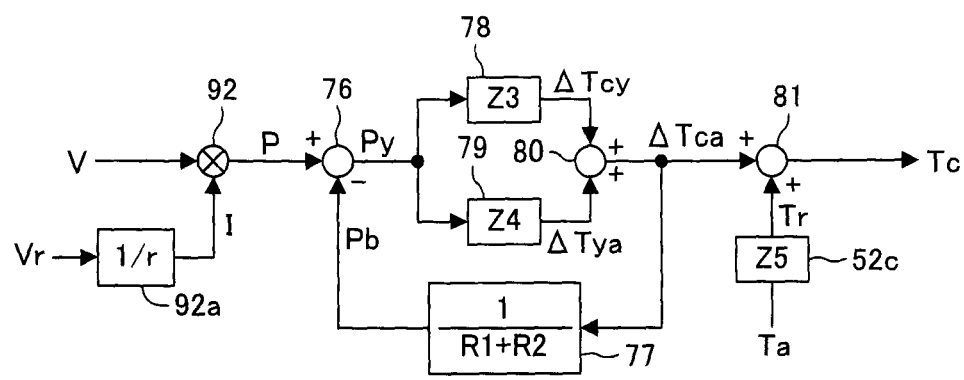
FIG. 10(B) is a computation block diagram for computing the temperature of the coil by a microcomputer based on the thermal equivalent circuit illustrated in FIG. 9(B).

Note that, also in the third embodiment, the temperature Tc of the coil is calculated on the assumption that the ambient temperature sensor 21 is arranged in proximity to the transducer 40 and that the temperature Ta in the room detected by the ambient temperature sensor 21 is the ambient temperature Ta of the transducer 40. However, also in this case, there are cases in which the ambient temperature sensor 21 and the transducer 40 are apart from each other and temperatures differ to some extent between the air temperature Ta at the ambient temperature sensor 21 and the air temperature Tr at the transducer 40. Therefore, also in this case, taking into consideration space between the ambient temperature sensor 21 and the transducer 40, the above-mentioned thermal equivalent circuit illustrated in FIG. 9(A) is modified as illustrated in FIG. 9(B), and the above-mentioned computation block diagram illustrated in FIG. 10(A) is modified as illustrated in FIG. 10(B). The modification is the same as that of the thermal equivalent circuit and the computation block diagram according to the modified example of the first embodiment described above, and thus, like reference symbols are used to omit description thereof.

The microcomputer 30 calculates the temperature Tc of the coil 16 in accordance with the computation block illustrated in FIG. 10(B) according to the modified example. Therefore, also according to this modified example, even when the ambient temperature sensor 21 and the transducer 40 are apart from each other and there is a difference between the air temperature Ta at the ambient temperature sensor 21 and the air temperature Tr at the transducer 40, the difference in air temperature is taken into consideration in calculating the coil temperature Tc. Thus, the temperature Tc of the coil 16 is calculated with high accuracy.

d. Fourth Embodiment

Figure 11:
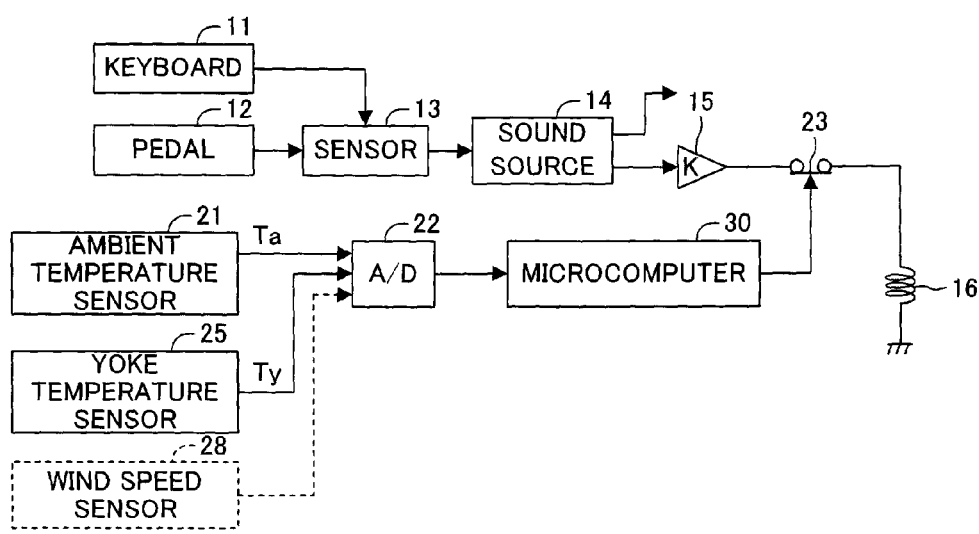
FIG. 11 is a schematic block diagram illustrating an electronic circuit built in a piano for vibrating a soundboard according to a fourth embodiment of the present invention.

Next, a piano according to a fourth embodiment of the present invention is described. In an electronic circuit of the piano according to the fourth embodiment, as illustrated in FIG. 11, compared with the above-mentioned case of the first embodiment illustrated in FIG. 1, a connecting line for inputting the voltage V applied to the coil 16 to the A/D conversion circuit 22 is omitted, and instead, a yoke temperature sensor 25 is provided. The yoke temperature sensor 25 is formed of, for example, a thermal diode temperature sensor, a thermistor temperature sensor, or the like. As indicated by the broken line in FIG. 2, the yoke temperature sensor 25 is mounted on the yoke 44, and detects a temperature of the yoke 44 (that is, a yoke temperature) Ty to output a detection signal representing the yoke temperature Ty to the A/D conversion circuit 22. The A/D conversion circuit 22 performs A/D conversion of the detection signal representing the yoke temperature Ty instead of the voltage V applied to the coil 16 in the case of the first embodiment described above, and supplies the result to the microcomputer 30. Other portions of the electronic circuit are formed similarly to those in the case of the first embodiment described above. Further, the transducer 40 of the piano according to the fourth embodiment is also formed similarly to the above-mentioned transducer of the first embodiment illustrated in FIG. 2. Therefore, also in the case of the fourth embodiment, only points different from those of the above-mentioned first embodiment are described, and like reference symbols are used to denote like portions to omit description thereof.

Figure 12A:
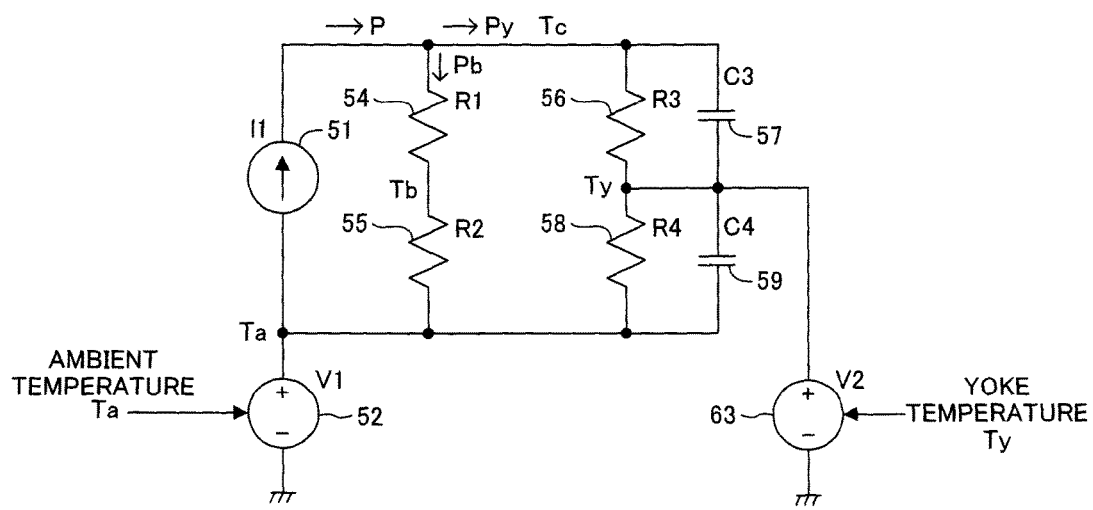
FIG. 12(A) illustrates a thermal equivalent circuit of a transducer for calculating a temperature of a coil illustrated in FIG. 11 according to the fourth embodiment of the present invention.

In the thermal equivalent circuit of the transducer 40 for calculating the temperature Tc of the coil 16 in the fourth embodiment, as illustrated in FIG. 12(A), the input path of the voltage V applied to the coil 16, the feedback path of the temperature Tc of the coil 16, and the computing unit 53 in the first embodiment described above are omitted. Note that, in this case, for the calculation of the temperature Tc of the coil 16, the current source 51, the coil-bobbin thermal resistor 54, and the bobbin heat dissipation resistor 55 are not necessary, but those components are the components of the transducer 40. Thus, in FIG. 12(A), those components 51, 54, 55 are also included. Further, in the thermal equivalent circuit according to the fourth embodiment, a voltage source 63 is provided between the ground and a node between the magnetic fluid thermal resistor 56 and the yoke heat dissipation resistor 58. The voltage source 63 corresponds to the yoke temperature Ty, and outputs a voltage corresponding to the yoke temperature Ty detected by the yoke temperature sensor 25. Other structures are the same as those in the case of the first embodiment described above.

Figure 13A:
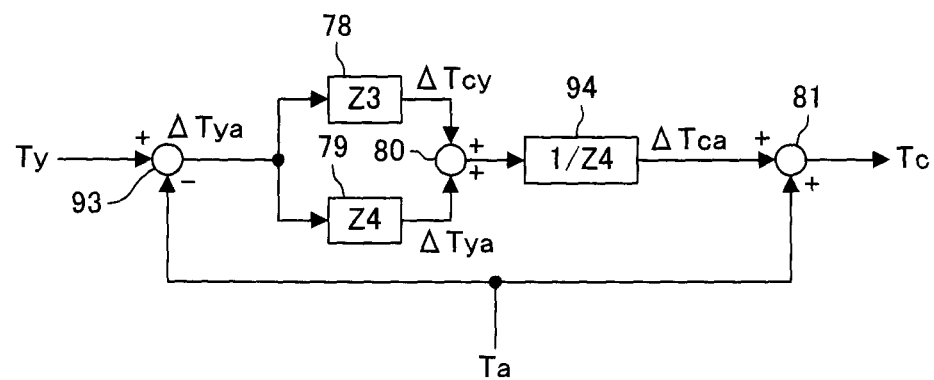
FIG. 13(A) is a computation block diagram for computing the temperature of the coil by a microcomputer based on the thermal equivalent circuit illustrated in FIG. 12(A)

A computation block for calculating the temperature Tc of the coil 16 based on the thermal equivalent circuit is as illustrated in FIG. 13(A). In this case, a voltage at the node between the magnetic fluid thermal resistor 56 and the yoke heat dissipation resistor 58 corresponds to the yoke temperature Ty, and a voltage across the yoke heat dissipation resistor 58 corresponds to a difference Ty−Ta (yoke temperature rise ΔTya) between the yoke temperature Ty and the ambient temperature Ta. For the purpose of calculating this difference, a subtracting portion 93 is provided in the computation block. A current in accordance with this difference Ty−Ta flows through the parallel circuit of the magnetic fluid thermal resistor 56 and the magnetic fluid thermal capacitor 57, and a voltage across the magnetic fluid thermal resistor 56 (magnetic fluid temperature rise ΔTcy) is determined based on the current. By adding the yoke temperature rise ΔTya (temperature difference Ty–Ta) and the magnetic fluid temperature rise ΔTcy to the ambient temperature Ta, the temperature Tc of the coil 16 is calculated. The calculation of temperature is realized by the subtracting portion 93, the computing portions 78, 79, and 94, and the adding portions 80 and 81. Specifically, the magnetic fluid temperature rise ΔTcy is calculated through computing processing by the subtracting portion 93 and the computing portions 78 and 94, the yoke temperature rise ΔTya is calculated through computing processing by the subtracting portion 93 and the computing portions 79 and 94, and the magnetic fluid temperature rise ΔTcy and the yoke temperature rise ΔTya are summed through adding processing by the adding portion 80. Then, a sum value ΔTca of the magnetic fluid temperature rise ΔTcy and the yoke temperature rise ΔTya is added to the ambient temperature Ta through computing processing by the adding portion 81. Note that, details of the computation by the computing portions 78 and 79 and the adding portions 80 and 81 are the same as those in the case of the first embodiment described above. Further, the computing portion 94 is computing means for converting a value into a reciprocal thereof through computing processing similar to that by the computing portion 79.

Operation of the fourth embodiment formed in this way is described. Also in the fourth embodiment, the microcomputer 30 calculates the temperature Tc of the coil 16 by executing the program illustrated in FIG. 3, and determines whether the calculated temperature Tc is equal to or higher than the upper limit temperature Tup. However, in this case, in Step S11, the ambient temperature Ta and the yoke temperature Ty are input. Further, in Step S12, the temperature Tc of the coil 16 is calculated in accordance with the computation block illustrated in FIG. 13(A) by using the ambient temperature Ta and the yoke temperature Ty. When the calculated temperature Tc is lower than the upper limit temperature Tup, the relay circuit 23 is held in the on state so that the audio signal (voltage signal) is continuously applied to the coil 16, thereby converting the audio signal into an acoustic signal. Thus, the performer and an audience can hear a performance sound corresponding to the performance of the keyboard 11 and the pedals 12 by the performer. On the other hand, when the calculated temperature Tc is equal to or higher than the upper limit temperature Tup, the relay circuit 23 is switched to the off state so that the application of the audio signal (voltage signal) to the coil 16 is blocked, thereby preventing the temperature Tc of the coil 16 from excessively rising. Thus, an abnormal event and burning of the coil 16 and its peripheral devices can be avoided.

As described above, in the calculation of the temperature Tc of the coil 16, in accordance with the computation block illustrated in FIG. 13(A), the microcomputer 30 inputs the ambient temperature Ta and the yoke temperature Ty, and calculates the temperature Tc of the coil 16 by using the ambient temperature Ta and the yoke temperature Ty that are input thereto. Therefore, according to the fourth embodiment, the yoke temperature sensor 25 for detecting the yoke temperature Ty is necessary, but, compared with the cases of the first to third embodiments described above, the computing processing is simplified and the calculation of the temperature Tc of the coil 16 becomes simpler.

Figure 12B:
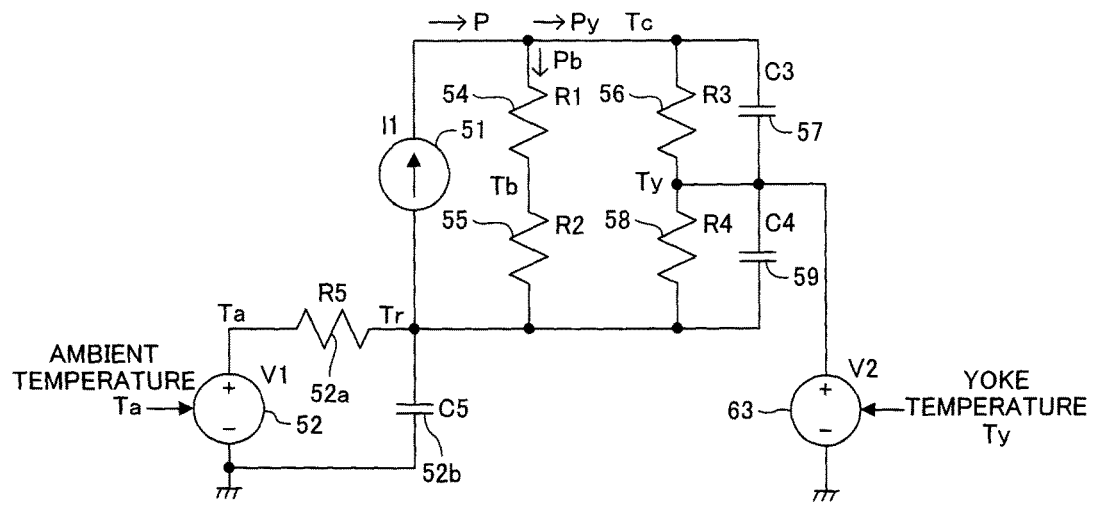
FIG. 12(B) illustrates a thermal equivalent circuit of a transducer according to a modified example of the one illustrated in FIG. 12(A).
Figure 13B:
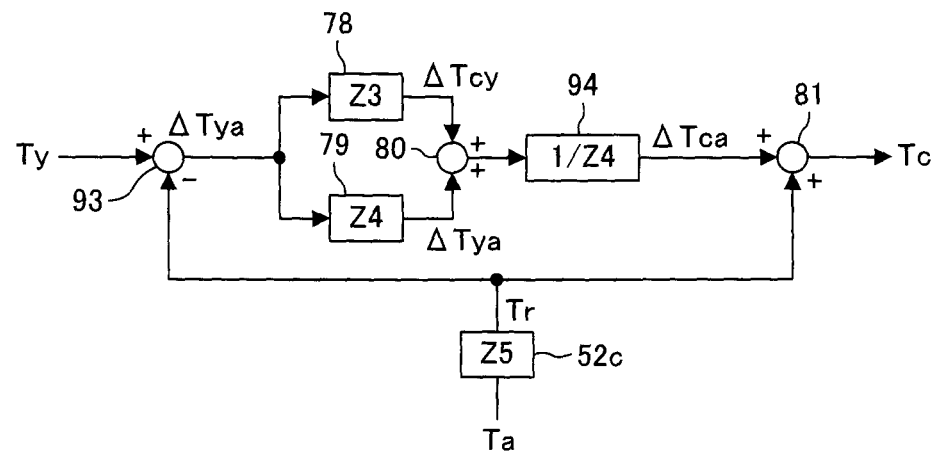
FIG. 13(B) is a computation block diagram for computing the temperature of the coil by a microcomputer based on the thermal equivalent circuit illustrated in FIG. 12(B).

Note that, also in the fourth embodiment, the temperature Tc of the coil is calculated on the assumption that the ambient temperature sensor 21 is arranged in proximity to the transducer 40 and that the temperature Ta in the room detected by the ambient temperature sensor 21 is the ambient temperature Ta of the transducer 40. However, also in this case, there are cases in which the ambient temperature sensor 21 and the transducer 40 are apart from each other and temperatures differ to some extent between the air temperature Ta at the ambient temperature sensor 21 and the air temperature Tr at the transducer 40. Therefore, also in this case, taking into consideration space between the ambient temperature sensor 21 and the transducer 40, the above-mentioned thermal equivalent circuit illustrated in FIG. 12(A) is modified as illustrated in FIG. 12(B), and the above-mentioned computation block diagram illustrated in FIG. 13(A) is modified as illustrated in FIG. 13(B). The modification is the same as that of the thermal equivalent circuit and the computation block diagram according to the modified example of the first embodiment described above, and thus, like reference symbols are used to omit description thereof.

The microcomputer 30 calculates the temperature Tc of the coil 16 in accordance with the computation block illustrated in FIG. 13(B) according to the modified example. Therefore, also according to this modified example, even when the ambient temperature sensor 21 and the transducer 40 are apart from each other and there is a difference between the air temperature Ta at the ambient temperature sensor 21 and the air temperature Tr at the transducer 40, the difference in air temperature is taken into consideration in calculating the coil temperature Tc. Thus, the temperature Tc of the coil 16 is calculated with high accuracy.

e. Modified Examples

Further, in carrying out the present invention, the present invention is not limited to each of the above-mentioned first to fourth embodiments and modified examples thereof, and various kinds of changes can be made without departing from the object of the present invention.

In the first to third embodiments and modified examples thereof described above, the terminal voltage of the coil 16 is regarded as the voltage V applied to the coil 16 and is input to the microcomputer 30 via the A/D conversion circuit 22. However, instead of this, an output voltage of the amplifier circuit 15 on the input side of the relay circuit 23 may be input to the microcomputer 30 via the A/D conversion circuit 22. Further, on the assumption that the amplification factor K of the amplifier circuit 15 is constant, an input voltage of the amplifier circuit 15 may be input to the microcomputer 30 via the A/D conversion circuit 22, and the microcomputer 30 may multiply the input voltage by K and use the resultant voltage as the voltage V applied to the coil 16.

Further, in the first to fourth embodiments and modified examples thereof described above, by taking into consideration a wind speed in the room (ambience) in which the transducer 40 is placed, the temperature Tc of the coil 16 can be measured with higher accuracy. As the wind speed in the ambience in which the transducer 40 is placed becomes higher, the resistance value R2 of the bobbin heat dissipation resistor 55 and the resistance value R4 of the yoke heat dissipation resistor 58 become smaller. Therefore, a correction may be made so that the resistance values R2 and R4 become smaller as the wind speed in the ambience in which the transducer 40 is placed becomes higher. In this correction calculation, a conversion table, a conversion function, or the like, which is prepared based on a measurement result through an experiment and represents the resistance values R2 and R4 that vary in accordance with the wind speed, may be used.

Figure 8:
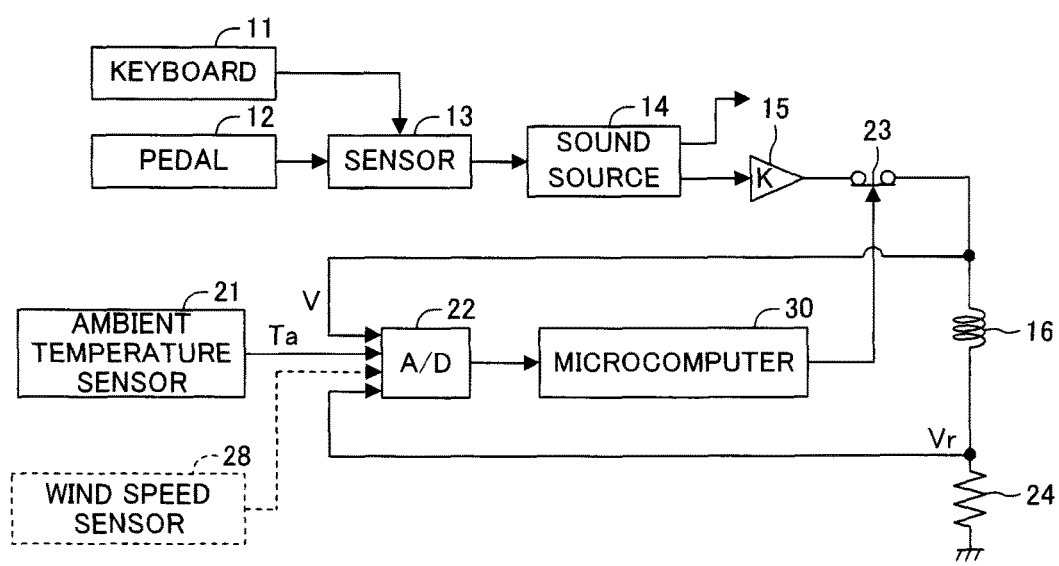
FIG. 8 is a schematic block diagram illustrating an electronic circuit built in a piano for vibrating a soundboard according to a third embodiment of the present invention.

Specifically, with reference to FIGS. 1, 8, and 11, as indicated by the broken lines, a wind speed sensor 28 is connected to the A/D conversion circuit 22, which is arranged in proximity to the transducer 40 and detects the wind speed in the ambience of the transducer 40 to output a detection signal representing the detected wind speed. The A/D conversion circuit 22 also performs A/D conversion of the detection signal representing the wind speed and supplies the result to the microcomputer 30. The microcomputer 30 corrects the resistance values R2 and R4 in the thermal equivalent circuits illustrated in FIGS. 4, 6, 9, and 12 and the computation blocks illustrated in FIGS. 5, 7, 10, and 13 so as to become smaller as the detected wind speed becomes higher, and calculates the temperature Tc of the coil 16.

Further, in the first to fourth embodiments and modified examples thereof described above, the relay circuit 23, that is, a relay switch, serving as protecting means for permitting or blocking energization of the coil 16 with an audio signal is provided subsequent to the amplifier circuit 15 to inhibit an excess rise in temperature Tc of the coil 16. However, instead of the relay circuit 23 as the protecting means, an electronic switch circuit including a transistor or the like may be provided and the microcomputer 30 may control on/off of switching of the electronic switch circuit. Further, the relay circuit 23 or the electronic switch circuit as the protecting means controls passing or blocking of the audio signal through the coil 16. Thus, the relay circuit 23 or the electronic switch circuit may be provided wherever in the path of the audio signal to the coil 16. The relay circuit 23 or the electronic switch circuit may be provided between the sound source circuit 14 and the amplifier circuit 15.

Figure 14:
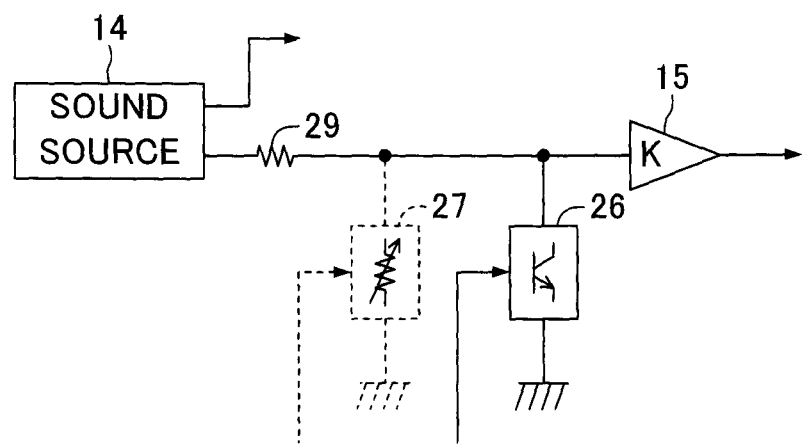
FIG. 14 is a schematic block diagram illustrating an electronic circuit of a modified portion according to a modified example of the first to fourth embodiments.

Further, in the first to fourth embodiments and modified examples thereof described above, instead of the relay circuit 23 or the electronic switch circuit, as illustrated in FIG. 14, an electronic switch circuit 26 that is normally in an off state may be provided between a connecting line connecting the sound source circuit 14 and the amplifier circuit 15 and the ground. When the temperature Tc of the coil 16 is equal to or higher than the upper limit temperature Tup, the microcomputer 30 may turn on the electronic switch circuit 26 so that energization of the coil 16 with an audio signal is blocked. In this case, a resistor 29 is provided between the sound source circuit 14 and a terminal of the electronic switch circuit 26 on the sound source circuit 14 side. Further, instead of the electronic switch circuit 26, a relay circuit similar to the relay circuit (relay switch) 23 used in the first to fourth embodiments and modified examples thereof described above may be used. The microcomputer 30 may hold this relay circuit normally in the off state and, when the temperature Tc of the coil 16 is equal to or higher than the upper limit temperature Tup, the microcomputer 30 may switch the relay circuit to an on state so that energization of the coil 16 with an audio signal is blocked. Further, in this modified example, the electronic switch circuit 26 or the relay circuit may be provided between a connecting line connecting the amplifier circuit 15 and the coil 16 and the ground.

Further, instead of the electronic switch circuit 26 or the relay circuit described above, an electronic volume may be used. In this case, for example, as indicated by the broken lines in FIG. 14, an electronic volume 27 may be provided between the connecting line connecting the sound source circuit 14 and the amplifier circuit 15 and the ground. Also in this case, the resistor 29 is provided between the sound source circuit 14 and a terminal of the electronic volume 27 on the sound source circuit 14 side. The electronic volume 27 is controlled by the microcomputer 30 to be held at a maximum volume when the temperature Tc of the coil 16 does not reach the upper limit temperature Tup. When the temperature Tc of the coil 16 is equal to or higher than the upper limit temperature Tup, a volume value of the electronic volume 27 may be reduced to reduce an amount of energization of the coil 16 with an audio signal. This also can prevent an excess rise in temperature Tc of the coil 16 by the electronic volume 27 as protecting means, and an abnormal event and burning of the coil 16 and its peripheral devices can be avoided. Further, also in this case, the electronic volume 27 may be provided between the connecting line connecting the amplifier circuit 15 and the coil 16 and the ground.

Further, in the first to fourth embodiments and modified examples thereof described above, the magnetic fluid 47 is provided in the transducer 40, but the present invention can also be applied to a transducer in which the magnetic fluid 47 is not provided. In this case, in the thermal equivalent circuits illustrated in FIGS. 4, 6, 9, and 12, the magnetic fluid thermal resistor 56 and the magnetic fluid thermal capacitor 57 are replaced by an air thermal resistor and an air thermal capacitor. The air thermal resistor has a resistance value that is extremely larger than that of the magnetic fluid thermal resistor 56, and the resistance value R3 in the thermal equivalent circuits illustrated in FIGS. 4, 6, 9, and 12 becomes extremely larger compared with the cases of the first to fourth embodiments and modified examples thereof described above. Therefore, most of the power consumption P (generated heat) of the coil 16 is dissipated via the bobbin 45. In this case, the temperature Tc of the coil 16 is higher than those in the cases of the first to fourth embodiments and modified examples thereof described above.

Figure 15A:
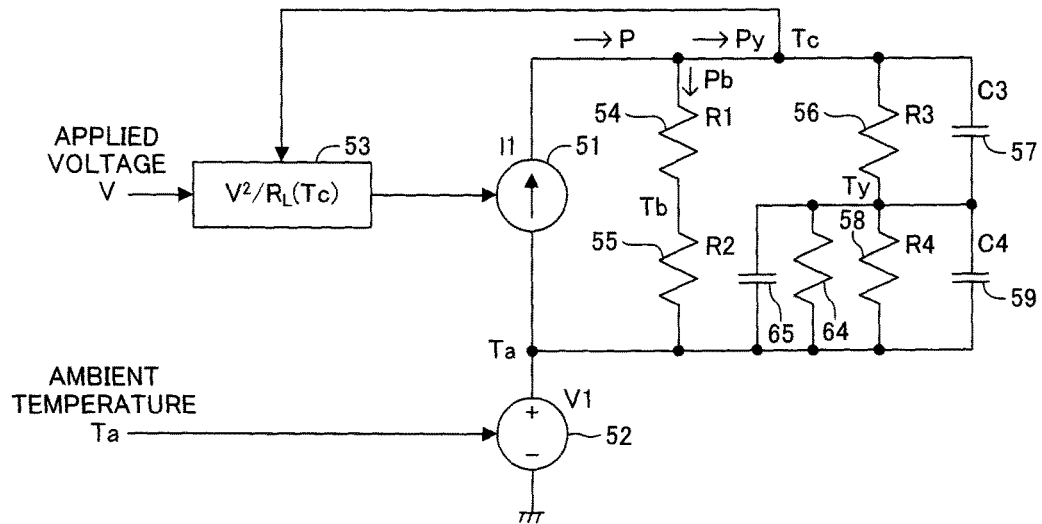
FIG. 15(A) illustrates a thermal equivalent circuit of a transducer in which a yoke is provided with a heat dissipation plate according to a modified example of the first to fourth embodiments.

Further, in the first to fourth embodiments described above, the present invention can also be applied to a transducer in which the yoke 44 is provided with a heat dissipation plate. In this case, in the thermal equivalent circuit illustrated in FIG. 4(A), a heat dissipation plate thermal resistor 64 and a heat dissipation plate thermal capacitor 65 are connected in parallel with the yoke heat dissipation resistor 58 and the yoke thermal capacitor 59 as illustrated in FIG. 15(A). Note that, the same can be said with regard to the thermal equivalent circuits illustrated in FIG. 6(A), FIG. 9(A), and FIG. 12(A). Therefore, the resistance value R4 of the yoke heat dissipation resistor 58 illustrated in FIG. 4(A), FIG. 6(A), FIG. 9(A), and FIG. 12(A) becomes substantially smaller. In this case, the temperature Tc of the coil 16 becomes lower than those in the cases of the first to fourth embodiments described above.

Figure 16A:
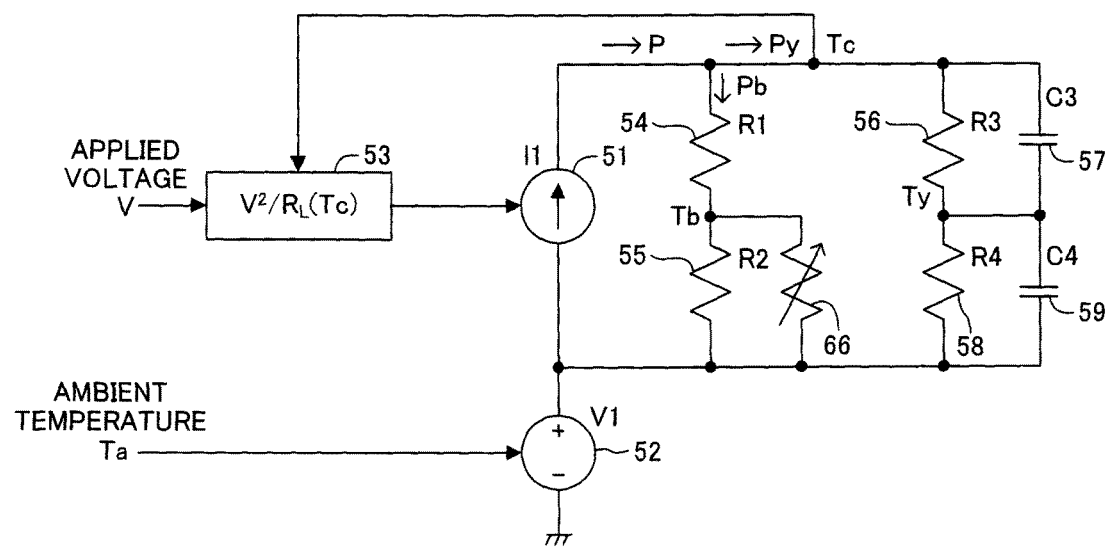
FIG. 16(A) illustrates a thermal equivalent circuit of a transducer in which a heat dissipation fan is provided in proximity to a bobbin according to a modified example of the first to fourth embodiments.

Further, in the first to fourth embodiments described above, the present invention can also be applied to a transducer in which a heat dissipation fan is provided in proximity to the bobbin 45. In this case, in the thermal equivalent circuit illustrated in FIG. 4(A), a heat dissipation fan resistor 66 is connected in parallel with the bobbin heat dissipation resistor 55 as illustrated in FIG. 16(A). Note that, the same can be said with regard to the thermal equivalent circuits illustrated in FIG. 6(A), FIG. 9(A), and FIG. 12(A). Therefore, the resistance value R2 of the bobbin heat dissipation resistor 55 illustrated in FIG. 4(A), FIG. 6(A), FIG. 9(A), and FIG. 12(A) becomes substantially smaller. In this case, the temperature Tc of the coil 16 becomes lower than those in the cases of the first to fourth embodiments described above. Further, by providing the heat dissipation fan, the resistance value R4 of the yoke heat dissipation resistor 58 become lower at the same time.

Figure 17A:
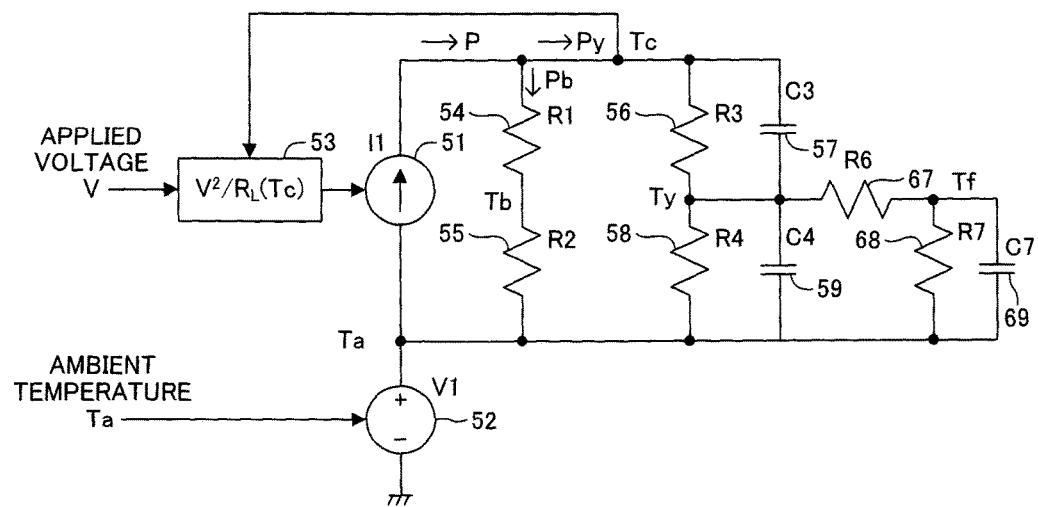
FIG. 17(A) illustrates a thermal equivalent circuit of a transducer in which a yoke is provided with a heat pipe according to a modified example of the first to fourth embodiments.

Further, in the first to fourth embodiments described above, the present invention can also be applied to a transducer in which the yoke 44 is provided with a heat pipe so that heat in the yoke 44 dissipates to a frame of the piano. In this case, in the thermal equivalent circuit illustrated in FIG. 4(A), a heat pipe heat dissipation resistor 67 and a frame heat dissipation resistor 68 are connected in parallel with the yoke heat dissipation resistor 58 and the yoke thermal capacitor 59 as illustrated in FIG. 17(A), and a frame thermal capacitor 69 is connected in parallel with the frame heat dissipation resistor 68. Note that, in FIG. 17(A), a resistance value of the heat pipe heat dissipation resistor 67 is represented by R6, a resistance value of the frame heat dissipation resistor 68 is represented by R7, and a capacitance value of the frame thermal capacitor 69 is represented by C7. Further, the same can be said with regard to the thermal equivalent circuits illustrated in FIG. 6(A), FIG. 9(A), and FIG. 12(A). Therefore, the resistance value R4 of the yoke heat dissipation resistor 58 illustrated in FIG. 4(A), FIG. 6(A), FIG. 9(A), and FIG. 12(A) becomes substantially smaller. In this case, the temperature Tc of the coil 16 becomes lower than those in the cases of the first to fourth embodiments described above.

Figure 15B:
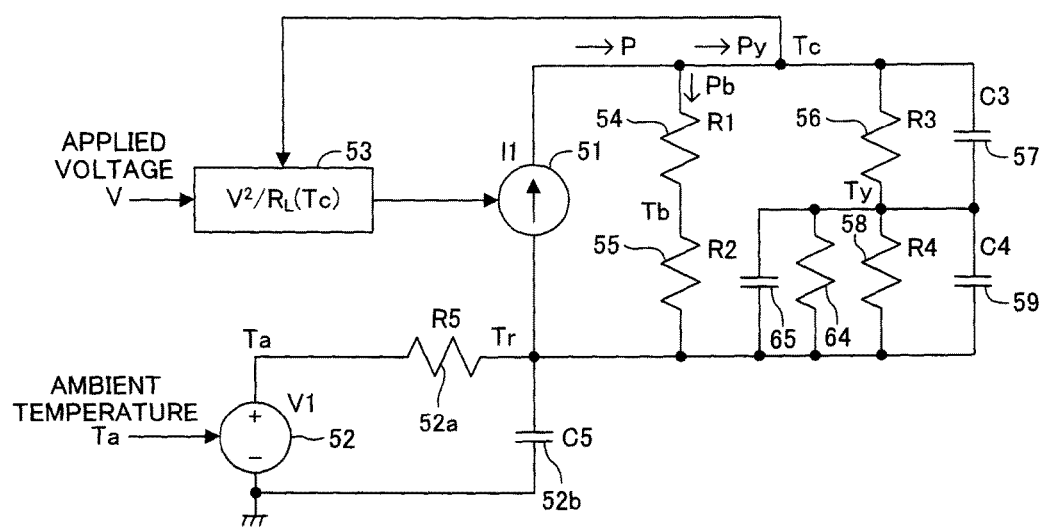
FIG. 15(B) illustrates a thermal equivalent circuit of a transducer according to a modified example of the one illustrated in FIG. 15(A).
Figure 16B:
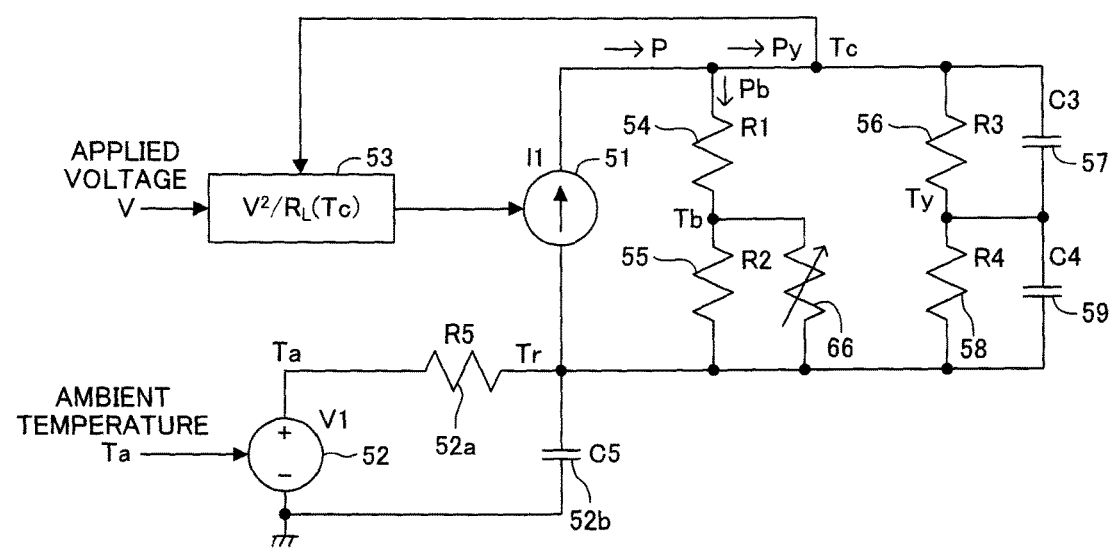
FIG. 16(B) illustrates a thermal equivalent circuit of a transducer according to a modified example of the one illustrated in FIG. 16(A).
Figure 17B:
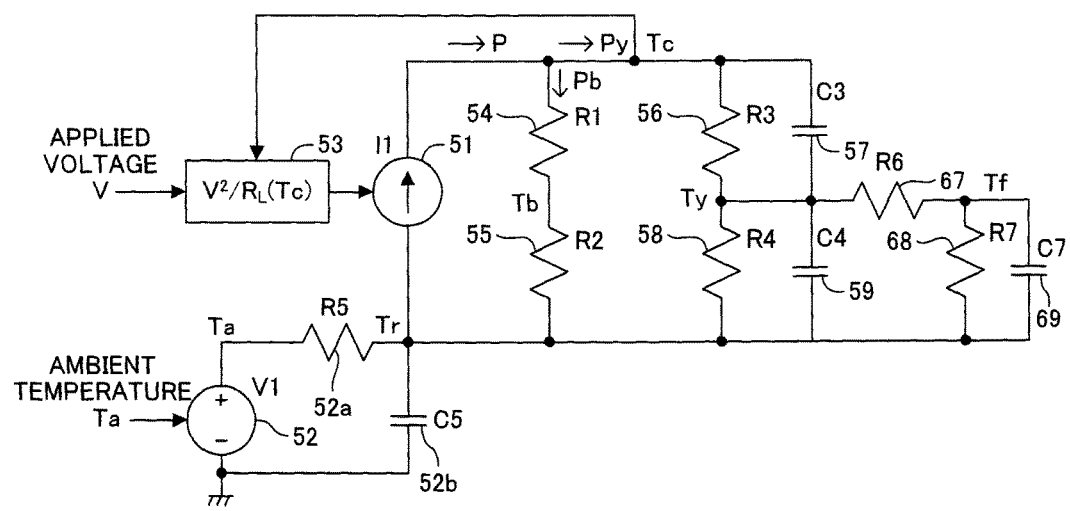
FIG. 17(B) illustrates a thermal equivalent circuit of a transducer according to a modified example of the one illustrated in FIG. 17(A).

Note that, also in the thermal equivalent circuits according to the modified examples illustrated in FIG. 15(A), FIG. 16(A), and FIG. 17(A), the coil temperature Tc is calculated on the assumption that the ambient temperature sensor 21 is arranged in proximity to the transducer 40 and that the temperature Ta in the room detected by the ambient temperature sensor 21 is the ambient temperature Ta of the transducer 40. However, also in those cases, there are cases in which the ambient temperature sensor 21 and the transducer 40 are apart from each other and temperatures differ to some extent between the air temperature Ta at the ambient temperature sensor 21 and the air temperature Tr at the transducer 40. Therefore, also in those cases, taking into consideration space between the ambient temperature sensor 21 and the transducer 40, the thermal equivalent circuits illustrated in FIG. 15(A), FIG. 16(A), and FIG. 17(A) described above are modified as illustrated in FIG. 15(B), FIG. 16(B), and FIG. 17(B), respectively. Further, the modification is the same as that of the thermal equivalent circuit according to the modified example of the first embodiment described above, and thus, like reference symbols are used to omit description thereof.

The microcomputer 30 calculates the temperature Tc of the coil 16 in accordance with the computation block corresponding to the modified examples. Therefore, also according to the modified examples, even when the ambient temperature sensor 21 and the transducer 40 are apart from each other and there is a difference between the air temperature Ta at the ambient temperature sensor 21 and the air temperature Tr at the transducer 40, the difference in air temperature is taken into consideration in calculating the coil temperature Tc. Thus, the temperature Tc of the coil 16 is calculated with high accuracy.

Further, in the first to fourth embodiments and modified examples thereof described above, one audio signal that is output from the sound source circuit 14 is introduced to the coil 16 of one transducer 40 so that the one transducer 40 vibrates the soundboard 48. However, instead of this, one audio signal that is output from the sound source circuit 14 may be introduced to coils of a plurality of transducers so that the plurality of transducers vibrate the soundboard 48.

Further, in the first to fourth embodiments and modified examples thereof described above, the present invention is applied to a piano. However, the present invention can also be applied to an electronic instrument not including a soundboard normally, to which a soundboard to be vibrated by an audio signal is newly provided so that the newly provided soundboard is vibrated by the transducer 40. Further, the present invention can also be applied to an acoustic signal converter that converts an audio signal into an acoustic signal by a speaker for vibrating a vibration member such as cone paper through energization of a voice coil instead of vibrating a soundboard. In this case, the coil 16 of the first to fourth embodiments and modified examples thereof described above can be adopted as the voice coil of the speaker.

Further, in the first to fourth embodiments and modified examples thereof described above, an audio signal is generated from the sound source circuit 14 in accordance with performance operation of the keyboard 11 and the pedals 12. However, instead of this, an audio signal may be generated from the sound source circuit 14 in accordance with performance operation of a performance operator other than the keyboard 11 and the pedals 12. Further, an audio signal may be generated from the sound source circuit 14 in accordance with performance data that is stored in advance. Still further, the present invention can also be applied to, in addition to an instrument, various kinds of acoustic signal converters as long as the acoustic signal converter converts an audio signal into an acoustic signal by using a transducer, a speaker, or the like. The sound source circuit 14 is not indispensable, and a recorded audio signal may be directly introduced to the transducer, the speaker, or the like to be converted into an acoustic signal.

The invention claimed is:

1. A temperature measurement device for an acoustic signal converter, which includes a coil, configured to convert an electric signal into an acoustic signal through energization of the coil, for measuring a temperature of the coil, the temperature measurement device comprising:
   an ambient temperature detector configured to detect an ambient temperature of an environment where the acoustic signal converter is to be or is disposed; and
   a processor configured to implement instructions stored in a memory and execute:
      a temperature calculating task that calculates the temperature of the coil based on an input voltage applied to the coil and a signal from the ambient temperature detector; and
      a power calculating task that calculates an amount of electric power consumed in the coil based on the input voltage applied to the coil and the temperature calculated by the temperature calculating task; and
      wherein the temperature calculating task calculates the temperature of the coil based also on the amount of electric power consumed calculated by the power calculating task.

2. The temperature measurement device according to claim 1, wherein:
   a resistance value of the coil changes in accordance with the temperature of the coil,
   the power calculating task calculates the amount of electric power consumed in the coil based on the resistance value of the coil and the input voltage applied to the coil.

3. The temperature measurement device according to claim 1, further comprising:
   a wind speed detector configured to detect a wind speed in the environment where the acoustic signal converter is disposed,
   wherein the temperature calculating task corrects the calculated temperature of the coil based on the detected wind speed.

4. The temperature measurement device according to claim 1, wherein the temperature calculating task compensates for a positional difference between the ambient temperature detector and the acoustic signal converter.

5. A protective device for an acoustic signal converter, the protective device comprising:
a protecting circuit; and
the temperature measurement device of claim 1,
wherein the processor is further configured to execute a protecting task that, when the calculated temperature of the coil is equal to or higher than a predetermined temperature, controls the protecting circuit to block energization of the coil or reduce an amount of energization of the coil.

6. A temperature measurement device for an acoustic signal converter, which includes a coil, configured to convert an electric signal into an acoustic signal through energization of the coil, for measuring a temperature of the coil, the temperature measurement device comprising:
an ambient temperature detector configured to detect an ambient temperature of an environment where the acoustic signal converter is to be or is disposed;
a current detector configured to detect a current value that flows through the coil; and
a processor configured to implement instructions stored in a memory and execute:
a temperature calculating task that calculates the temperature of the coil based on an input voltage applied to the coil, a signal from the ambient temperature detector, and a signal from the current, detector; and
a power calculating task that calculates an amount of electric power consumed in the coil based on the input voltage applied to the coil and the detected current value.

7. The temperature measurement device according to claim 6, further comprising:
a wind speed detector configured to detect a wind speed in an environment where the acoustic signal converter is disposed,
wherein the temperature calculating task corrects the calculated temperature of the coil based on the detected wind speed.

8. The temperature measurement device according to claim 6, wherein the temperature calculating task compensates for a positional difference between the ambient temperature detector and the acoustic signal converter.

9. A protective device for an acoustic signal converter, the protective device comprising:
a protecting circuit; and
the temperature measurement device of claim 6
wherein the processor is further configured to execute a protecting task that, when the calculated temperature of the coil is equal to or higher than a predetermined temperature, control the protecting circuit to block energization of the coil or reduce an amount of energization of the coil.

10. A temperature measurement device for an acoustic signal converter, which includes a yoke configured to form a magnetic path with a magnet, and a coil arranged in the magnetic path and becomes, when energized, displaced with respect to the yoke, configured to convert an electric signal into an acoustic signal by causing an electric signal to flow through the coil, the temperature measurement device being configured to measure a temperature of the coil, the temperature measurement device comprising:
an ambient temperature detector configured to detect an ambient temperature of an environment where the acoustic signal converter is to be or is disposed;
a yoke temperature detector configured to detect a temperature of the yoke; and
a processor configured to implement stored in a memory and execute:
a temperature calculating task that calculates the temperature of the coil based on a signal from the ambient temperature detector and a signal from the yoke temperature detector.

11. The temperature measurement device according to claim 10, further comprising:
a wind speed detector configured to detect a wind speed in the environment where the acoustic signal converter is disposed,
wherein temperature calculating task corrects the calculated temperature of the coil based on the detected wind speed.

12. The temperature measurement device according to claim 10, wherein the temperature calculating task compensates for a positional difference between the ambient temperature detector and the acoustic signal converter.

13. A protective device for an acoustic signal converter, the protective device comprising:
a protecting circuit; and
the temperature measurement device of claim 10,
wherein the processor is further configured to execute a protecting task that, when the calculated temperature of the coil is equal to or higher than a predetermined temperature, control the protecting circuit to block energization of the coil or reduce an amount of energization of the coil.

14. The temperature measurement device according to claim 10, wherein:
the processor is further configured to execute a power calculating task that calculates an amount of electric power consumed in the coil based on an input voltage applied to the coil and the temperature calculated by the temperature calculating task, and
the temperature calculating task calculates the temperature of the coil based also on the amount of electric power consumed calculated by the power calculating task.

15. The temperature measurement device according to claim 1, wherein the acoustic signal converter provides a thermal equivalent circuit including a current source corresponding to a heat source generated by the electrical power consumed in the coil, and a voltage source corresponds to a detected ambient temperature.

16. The temperature measurement device according to claim 6, wherein the acoustic signal converter provides a thermal equivalent circuit including a current source corresponding to a heat source generated by the electrical power consumed in the coil, and a voltage source corresponds to a detected ambient temperature.

17. The temperature measurement device according to claim 10, wherein the acoustic signal converter provides a thermal equivalent circuit including a current source corresponding to a heat source generated by the electrical power consumed in the coil, and a voltage source corresponds to a detected ambient temperature.

* * * * *